US012664742B2

(12) United States Patent
Virčiková et al.

(10) Patent No.: US 12,664,742 B2
(45) Date of Patent: Jun. 23, 2026

(54) METHOD, SYSTEM, AND MEDIUM FOR ENHANCING A 3D IMAGE DURING ELECTRONIC COMMUNICATION

(71) Applicant: MATSUKO s.r.o., Košice (SK)

(72) Inventors: Mária Virčiková, Košice (SK); Matúš Kirchmayer, Košice (SK); Rudolf Jakša, Košice (SK)

(73) Assignee: MATSUKO S.R.O., Košice (SK)

( * ) Notice: Subject to any disclaimer, the term of this patent is extended or adjusted under 35 U.S.C. 154(b) by 125 days.

(21) Appl. No.: 18/224,550

(22) Filed: Jul. 20, 2023

(65) Prior Publication Data

US 2025/0029346 A1     Jan. 23, 2025

(51) Int. Cl.
| | |
|---|---|
| *G06T 19/20* | (2011.01) |
| *G06T 7/50* | (2017.01) |
| *G06V 10/54* | (2022.01) |
| *G06V 40/16* | (2022.01) |
| *G06V 40/20* | (2022.01) |
| *H04N 7/15* | (2006.01) |

(52) U.S. Cl.
CPC ................ *G06T 19/20* (2013.01); *G06T 7/50* (2017.01); *G06V 10/54* (2022.01); *G06V 40/174* (2022.01); *G06V 40/20* (2022.01); *H04N 7/157* (2013.01); *G06T 2219/2021* (2013.01)

(58) Field of Classification Search
CPC ......... G06N 3/045; G06T 17/00; G06T 19/00; G06T 19/20; G06T 2219/2021; G06T 7/50; G06T 9/001; G06V 10/54; G06V 40/174; G06V 40/20; H04N 7/157
See application file for complete search history.

(56) References Cited

U.S. PATENT DOCUMENTS

| | | | |
|---|---|---|---|
| 9,904,660 B1 | 2/2018 | Wang et al. | |
| 2019/0012599 A1* | 1/2019 | el Kaliouby | ........... G06N 3/084 |
| 2021/0076002 A1* | 3/2021 | Peters | .................... H04N 7/152 |
| 2021/0334935 A1 | 10/2021 | Grigoriev et al. | |
| 2022/0172424 A1 | 6/2022 | Vircíkováet al. | |
| 2022/0207810 A1* | 6/2022 | Nemchinov | ............ G06T 17/20 |

OTHER PUBLICATIONS

D-ID; "The Digital People Platform"; https://www.d-id.com; retrieved Jul. 20, 2023.

(Continued)

*Primary Examiner* — Kee M Tung
(74) *Attorney, Agent, or Firm* — Tarolli, Sundheim, Covell & Tummino LLP

(57) ABSTRACT

A method and system for providing enhanced holographic communication is disclosed. Visual modeling data and verbal communication data of a conference participant in a current time frame are obtained as a current sample. The current sample is encoded into a first vector comprising a plurality of states for the current sample as an encoded result. At least one of the plurality of states is updated by inputting the encoded result to a generative artificial intelligent model as a prompt, and the updated plurality of states are obtained as a predicted result. The visual modeling data is then updated based on the predicted result for rendering a three-dimensional (3D) representation of the conference participant in the current time frame or in one or more future time frames.

19 Claims, 14 Drawing Sheets

(56) References Cited

OTHER PUBLICATIONS

Wikipedia the Free Encyclopedia; "Generative pre-trained transformer"; https://en.wikipedia.org/wiki/Generative_pre-trained_transformer; retrieved on Jul. 20, 2023; 11 pgs.

Wikipedia the Free Encyclopedia; "ChatGPT"; https://en.wikipedia.org/wiki/ChatGPT; retrieved on Jul. 20, 2023; 37 pgs.

Wikipedia the Free Encyclopedia; "Vision transformer"; https://en.wikipedia.org/wiki/Vision_transformer; retrieved Jul. 20, 2023; 5 pgs.

Arnab, Anurag, et al. "Vivit: A video vision transformer." Proceedings of the IEEE/CVF international conference on computer vision. 2021; 11 pgs.

Wikipedia the Free Encyclopedia; "Residual neural network"; https://en.wikipedia.org/wiki/Residual_neural_network; retrieved on Jul. 20, 2023; 7 pgs.

Wikipedia the Free Encyclopedia; "ImageNet"; https://en.wikipedia.org/wiki/ImageNet; retrieved on Jul. 20, 2023; 5 pgs.

Wikipedia the Free Encyclopedia; "Autoencoder"; https://en.wikipedia.org/wiki/Autoencoder; retrieved Jul. 20, 2023; 14 pgs.

Wikipedia the Free Encyclopedia; "Principal component analysis"; https://en.wikipedia.org/wiki/Principal_component_analysis; retrieved Jul. 20, 2023; 34 pgs.

TensorFlow; "tf.keras.applications.resnet50.ResNet50"; https://www.tensorflow.org/api_docs/python/tf/keras/applications/resnet50/ResNet50; retrieved Jul. 20, 2023; 3 pgs.

Phillipi; "pix2pix"; https://github.com/phillipi/pix2pix; retrieved Jul. 20, 2023; 8 pgs.

Hong, Wenyi, et al. "Cogvideo: Large-scale pretraining for text-to-video generation via transformers." arXiv preprint arXiv:2205.15868 (2022); 15 pgs.

Khachatryan, L. et al. "Text2Video-Zero: Text-to-Image Diffusion Models are Zero-Shot Video Generators", Mar. 23, 2023; 25 pgs.

Wikipedia the Free Encyclopedia' "Self-organizing map"; https://en.wikipedia.org/wiki/Self-organizing_map; retrieved Jul. 20, 2023; 11 pgs.

Wikipedia the Free Encyclopedia; "k-means clustering"; https://en.wikipedia.org/wiki/K-means_clustering; retrieved Jul. 20, 2023; 17 pgs.

Wikipedia the Free Encyclopedia; "Feature hashing"; https://en.wikipedia.org/wiki/Feature_hashing; retrieved Jul. 20, 2023; 8 pgs.

Inventor: Maria Vircíková, et al.; "Method, System, and Medium for Artificial Intelligence-Based Completion of a 3D Image During Electronic Communication"; U.S. Appl. No. 18/338,093, filed Jun. 20, 2023.

Aaron S. Jackson, Adrian Bulat, Vasileios Argyriou, Georgios Tzimiropoulos: "Large Pose 3D Face Reconstruction from a Single Image via Direct Volumetric CNN Regression", ARXIV:1703.07834V2, Sep. 8, 2017 (Sep. 8, 2017).

Alex Krizhevsky, Ilya Sutskever, Geoffrey E. Hinton: "ImageNet Classification with Deep Convolutional Neural Networks", NIPS '12: Proceedings of the 25th International Conference on Neural Information Processing Systems, vol. 1, Dec. 2012 (Dec. 1, 2012), pp. 1097-1105, XP055309176.

Kaiming He, Xiangyu Zhang, Shaoqing Ren, Jian Sun: "Deep Residual Learning for Image Recognition", ARXIV:1512.03385V1, Dec. 10, 2015 (Dec. 10, 2015).

Olaf Ronneberger, Philipp Fischer, Thomas Brox: "U-Net: Convolutional Networks for Biomedical Image Segmentation", ARXIV:1505.04597V1, May 18, 2015 (May 18, 2015).

Phillip Isola, Jun-Yan Zhu, Tinghui Zhou, Alexei A. Efros: "Image-to-Image Translation with Conditional Adversarial Networks", ARXIV:1611.07004V3, Nov. 26, 2018 (Nov. 26, 2018).

Mildenhall, B., et al.: "NeRF: Representing Scenes as Neural Radiance Fields for View Synthesis", ARXIV:2003.08934.

European Application No. EP24188051; European Search Report dated Dec. 2, 2024; 2 pgs.

* cited by examiner

METHOD, SYSTEM, AND MEDIUM FOR ENHANCING A 3D IMAGE DURING ELECTRONIC COMMUNICATION

TECHNICAL FIELD

The present disclosure is directed at methods, systems, and techniques for enhancing a three-dimensional (3D) image during electronic communication.

BACKGROUND

The field of holographic communication presents a number of unique challenges, particularly due to the nature of 3D capture and display techniques. Often, certain parts of a hologram are missing or inaccurately represented due to limitations in the capture process, or because parts of the participant's face or body are obscured. While these gaps can sometimes be filled by extrapolating from the environment or using historical data for larger, static elements such as hair or ears, dynamic facial features critical to nonverbal communication, such as the eyes, mouth, and cheeks, present a much greater challenge.

Existing methods for handling these critical elements of the hologram have their limitations. The difficulty lies in their ability to convincingly reconstruct and animate the active and expressive parts of the face that are central to effective communication.

SUMMARY

According to a first aspect, there is provided a method comprising: obtaining visual modeling data and verbal communication data of a conference participant in a current time frame as a current sample; encoding the current sample into a first vector representing a sequence of states of the current sample as an encoded result, wherein the plurality of states comprises one or more of texture, shape, eye behavior, mouth and facial expression, head movement, landmark position, speech, or script, and wherein each of the plurality of states is characterized by a plurality of elements; inputting the encoded result to a generative artificial intelligence model as a prompt to generate a predicted result, wherein at least one element of the predicted result is changed compared with a corresponding element of the encoded result; and updating the visual modeling data based on the predicted result for rendering a three-dimensional (3D) representation of the conference participant in the current time frame or in one or more future time frames.

In some embodiments, updating the visual modeling data may comprise inputting the predicted result to a reconstruction or completion artificial neural network model to obtain the updated visual modeling data for rendering the 3D representation of the conference participant in the current time frame or in the one or more future time frames.

In some embodiments, updating the visual modeling data may comprise decoding the predicted result into the updated visual modeling data for rendering the 3D representation of the conference participant in the current time frame or in the one or more future time frames.

In some embodiments, the predicted result may have a same format as the encoded result.

In some embodiments, the visual modeling data may comprise one or more of texture data, shape data, facial expression data, head movement data, or eyes behavior data, and the verbal communication data comprises one or more of audio data or text data.

In some embodiments, updating at least one of the plurality of states may comprise updating one or more of texture, shape, eye behavior, or mouth and facial expression of the conference participant where a portion of the conference participant's head is obstructed.

In some embodiments, the method may further comprise selecting the visual modeling data of the conference participant in a plurality of past time frames as past samples; encoding the past samples into a second plurality of vectors representing a sequence of states of the past samples; and updating at least one element of the first vector by inputting the second plurality of vectors to the generative artificial intelligence model as additional prompts. Additionally or optionally, the plurality of past time frames may be sampled at a constant frequency. Alternatively, the plurality of past time frames may be irregularly sampled. Additionally or optionally, the method may further comprise, prior to encoding the past samples into a second plurality of vectors: obtaining at least one of the visual modeling data or the verbal communication data of additional one or more conference participants in the plurality of past time frames; and adding the at least one of the visual modeling data or the verbal communication data of the additional one or more conference participants in the plurality of past time frames into the past samples.

In some embodiments, the method may further comprise, prior to encoding the current sample into a first vector: obtaining at least one of the visual modeling data or the verbal communication data of additional one or more conference participants in the current time frame; and adding the at least one of the visual modeling data or the verbal communication data of additional one or more conference participants in the current time frame into the current sample.

In some embodiments, the method may further comprise encoding the first vector into a sequence of tokens values; and updating the encoded result with the sequence of token values, such that the encoded result is compatible with the generative artificial intelligence model being a transformer model.

In some embodiments, the method may further comprise obtaining a sequence of video frames captured by a camera for the conference participant, the sequence of video frames comprising two-dimensional (2D) image data, depth data, and head alignment data; and reconstructing, for the current time frame of the sequence of video frames, the visual modeling data by projecting the 2D image data from a world space into an object space using the head alignment data and depth data. Additionally or optionally, the method may further comprise completing at least one missing part of the reconstructed visual modeling data by a pre-trained artificial neural network.

In some embodiments, the 3D representation of the conference participant may comprise one or more of a hologram, a parametric human representation, a stereoscopic 3D representation, a volumetric representation, a mesh-based representation, a point-cloud based representation, a radiance field representation, or a hybrid representation.

In some embodiments, the generative artificial intelligence model may be selected from one of transformer models, Stable Diffusion models, Generative Adversarial Networks, or autoencoders.

According to another aspect, there is provided a system comprising: a network interface; a processor communicatively coupled to the network interface; and a non-transitory computer readable medium communicatively coupled to the processor and having stored thereon computer program code that is executable by the processor and that, when executed by the processor, causes the processor to perform the aforementioned method.

The system may further comprise a camera communicatively coupled to the processor, the camera for capturing an image of the conference participant.

The system may further comprise a display device communicatively coupled to the processor, and the method may further comprise displaying the reconstructed three-dimensional representation on the display.

According to another aspect, there is provided a non-transitory computer readable medium having encoded thereon computer program code that is executable by a processor and that, when executed by the processor, causes the processor to perform the aforementioned method.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
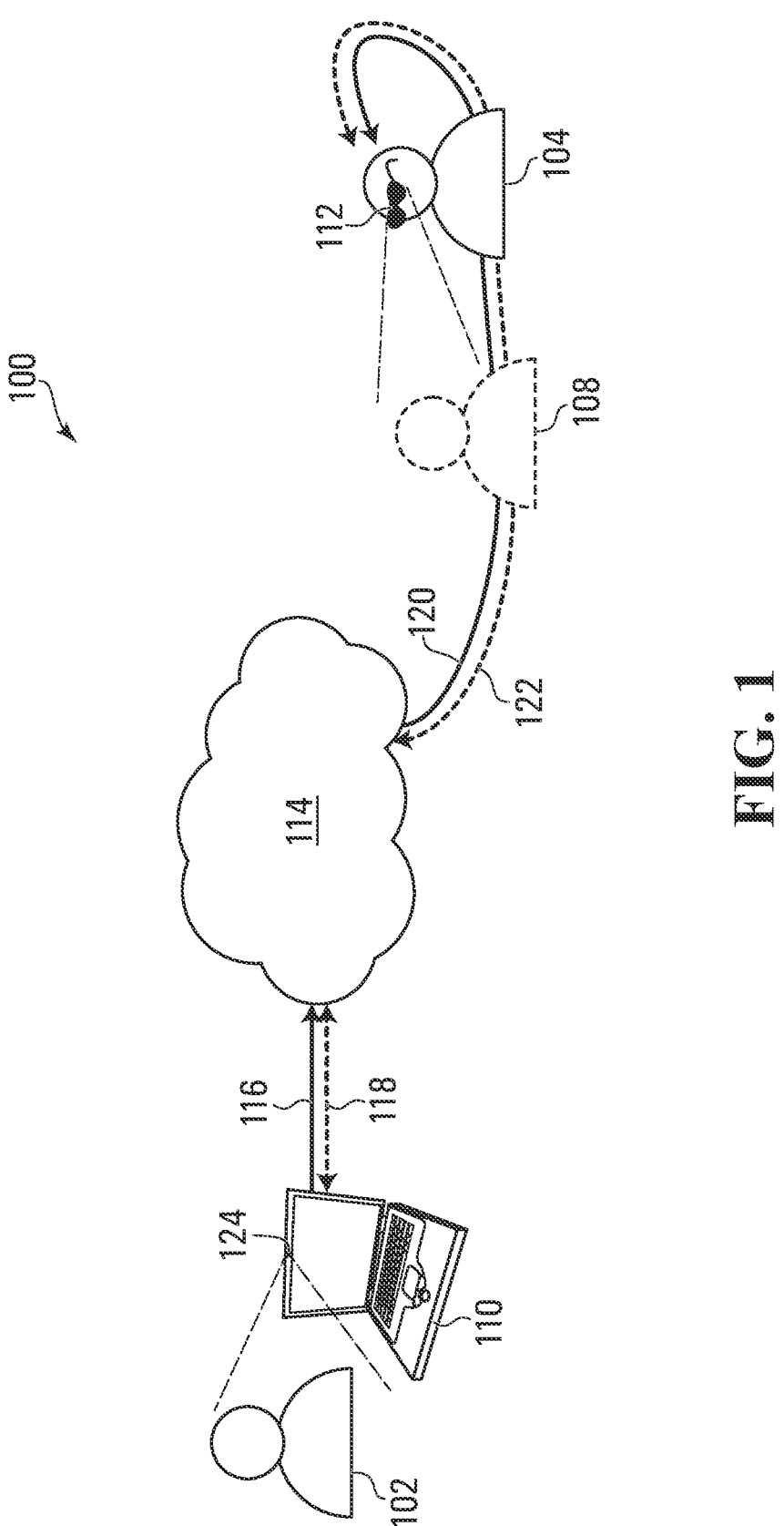
FIGS. 1 and 2 depict a system for three-dimensional electronic communication in which two parties are communicating with each other, according to an example embodiment.

Two-dimensional ("2D") communication, such as conventional videoconferencing, involves capturing a 2D video stream using a camera of a first conference participant, transmitting that data to a second conference participant, and then displaying that video stream on a display of the second conference participant. While an improvement over a phone conversation, 2D videoconferencing nonetheless falls well short of replicating the immersion and non-verbal communication possible during an in-person conversation. One way in which to improve upon 2D communication in this regard is to adopt communication that expresses depth: this may be 2.5-dimensional ("2.5D") or three-dimensional ("3D").

An example of conventional 3D communication is using 3D computer models in the form of animated avatars to represent conference participants. While suitable for certain applications, using animated 3D avatars for communication sidesteps the problem of attempting to replicate realistic, in-person communication by emphasizing the computer-animated nature of the avatars as a feature. Accordingly, the various problems associated with realistic 3D electronic communication, such as how to replicate at least part of a conference participant (e.g. at least that participant's face, and in certain circumstances at least that participant's head and upper body) in 3D and in real-time from non-3D data, are not addressed in avatar-based systems.

In contrast, in at least some of the embodiments described herein, 3D communication is performed by regenerating photo-realistic representations of conference participants. 2D or 2.5D image data resulting from a camera having imaged at least part of a 3D face of a conference participant is obtained. In at least some embodiments, more than the face may be imaged; for example, in addition to the face, part or all of the head and/or body (e.g. neck and upper torso) may also be imaged. One or more artificial neural networks, such as convolutional neural networks (each a "CNN"), are applied to process that image data and to output data enabling reconstruction of a photo-realistic, 2.5-dimensional or three-dimensional representation of at least the conference participant's face and, depending on the input data, in some embodiments also more of the participant's body more generally (e.g. the head, neck, and upper torso). The one or more neural networks' data output is at a rate permitting real-time reconstruction of the face. In various example embodiments, as described further below, the one or more neural networks may be used to perform eye area deocclusion, texture reconstruction, and reconstruction of portions of a conference participant's head not depicted in the 2D or 2.5D image data that the one or more neural networks process.

As used herein, the following terms have the following meanings:

2D Data: Data depicting a 2D image, such as a bitmap, JPEG, or PNG image. 2D data includes data depicting still images, and data comprising part of a video stream depicting multiple 2D images. 2D data may include raster and vector images.

2.5D Data: 2D data that includes a depth map. For example, while 2D data may comprise RGB channels, analogous 2.5D data would comprise RGBD channels. In at least some embodiments, a 3D image with one or more holes is a 2.5D image.

3D capable display device: A display device that can display a 3D object to a conference participant. Examples of 3D capable display devices comprise headsets; 3D televisions and monitors; holographic projectors; and a rendering or projection of 3D data on a classical 2D display.

3D Data: Data representing a 3D model. Examples of 3D data include voxels, depth map data, point-cloud data, and mesh data. 3D data includes data depicting a still 3D model, and a stream of data depicting a 3D model in motion. 3D data may be acquired, for example, using specialized 3D scanning hardware. Examples of suitable scanning hardware comprise "The Relightables"

volumetric capture system by Google™ AI or the capture system used by Facebook™ Reality Labs. "Full-featured" 3D data of a body part herein refers to 3D data covering depicting the entirety of that body part, without gaps in the data. For example, full-featured 3D data of a person's head represents a 3D model of the head showing hair on the top of the head plus a 360 degree view around the front, sides, and back of the head.

Artificial neural network: Also referred to simply as a "neural network" herein, a type of data processing system that relies on machine learning to become suitably configured to perform a particular task. Neural networks are capable of performing massively parametric nonlinear extrapolation. Examples of neural networks that may be used in at least some of the embodiments herein are CNNs and multilayer perceptron ("MLP") neural networks.

Convolutional neural network, or CNN: A type of artificial neural network configured particularly for image processing.

Depth map: a representation of 3D data as a projection in a suitable coordinate space (e.g. Cartesian, cylindrical, or spherical) in which the 3D surface is encoded as the distances of points from a surface of the projection to a reference plane (e.g. a cylinder for a cylindrical projection, a sphere for a spherical projection, or an orthographic or perspective projection to a flat plane for Cartesian space).

Face landmarks: a vector of numbers representing one or more facial features, such as corners of eyes, the mouth, the nose, and analogous features.

Headset: Wearable glasses permitting display of 3D objects to a wearer. Example headsets comprise virtual reality ("VR"), augmented reality ("AR"), and mixed reality ("MR") headsets.

Hole in an image: an undefined part of a surface shown in an image, such as a 3D image (e.g. skin of the face) resulting from missing data when sampling, for example, a series of 2D or 2.5D images used to reconstruct the 3D image.

Object space: A coordinate space anchored to an object. In the object space, regardless of the motion of that object, a certain landmark on that object maintains the same coordinates. For example, if the object is a head of a person and the object space is anchored to that person's nose, then regardless of how that persons turns their head, the nose has the same object space coordinates.

Peer-to-peer ("P2P") communication: Communication between two endpoints in which data is not routed through a central server, but directly between the two endpoints.

Photo-realistic image: An image (whether 2D or 3D, and whether standalone or as part of a video) generated by data resulting from light captured on a sensor and displayed as a matrix of intensities of light and optionally color on particular locations in a raster, and images analogous thereto and/or resulting from a transformation thereof. In contrast to an avatar-based representation of a face in which only certain face landmarks are selected and mapped to an animated avatar, photo-realistic 3D video in at least some embodiments is generated not by using face landmarks as in an avatar-based approach, but from a transformation of 2D or 2.5D input video. For example, a 3D reconstruction of a head may be generated by transforming all 2D video of the head captured by a camera using an artificial neural network, as opposed to simply selecting certain facial landmarks on the head and mapping those facial landmarks to an avatar to morph the avatar.

Real-time video processing: Processing of an input video stream such that the output video stream resulting from the processing is provided at almost the same time as the input (e.g. a latency of no more than 500 ms) and at a suitable frame rate (e.g. at least 15 fps) as the input video stream.

RGB channels: The three different channels respectively used to represent a 2D image as a superposition of red, green, and blue matrices in which every entry in the matrix represents a pixel value in red, green, and blue.

RGBD channels: The four different channels respectively used to represent a 2.5D or 3D image in which RGB channels are combined with a depth channel that represents depth. Depth may be represented as a z-axis position when Cartesian coordinates are used. Alternatively, depth may be represented in any suitable alternative coordinate space, such as cylindrical or spherical, in which case the values for the RGB channels are correspondingly mapped to that coordinate space.

RGB voxels: A voxel that has red, green, and blue channels, thereby permitting the voxel to represent depth and texture.

Voxels: The 3D analogue to pixels. Voxels are used to represent 3D data in a raster format.

World space: A coordinate space that is fixed regardless of the motion of particular objects within it. For example, a world space may be shared by several call participants, while motion of various objects in the world space means the world space coordinates of those objects change.

Referring now to FIG. 1, there is depicted a system 100 for 3D electronic communication, according to an example embodiment. In at least some of the example embodiments described below, the type of 3D electronic communication is holographic communication, as is possible using certain types of headsets (e.g. Microsoft™ HoloLens™). In at least some other example embodiments, the type of 3D electronic communication may comprise, for example, displaying a 3D representation of one of the conference participants on to the 2D screen of another of the conference participants.

The system 100 of FIG. 1 is being used by a first conference participant 102 and a second conference participant 104. In FIG. 1, a first video acquisition device 110, such as a personal computer, comprising a camera 124 captures a 2D video stream of the first participant 102. The first video acquisition device 110 is networked to cloud infrastructure 114, comprising one or more servers. The cloud infrastructure 114 receives the 2D video stream from the first video acquisition device 110 and applies an artificial neural network to process it such that the artificial neural network outputs data enabling reconstruction of a photo-realistic, 2.5-dimensional or three-dimensional representation of the first participant's 102 head. In particular, the artificial neural network reconstructs the portions of the first participant's 102 head not depicted in the 2D image data captured by the camera 124 on the first video acquisition device 110 in 3D. For example, the artificial neural network in at least some example embodiments outputs data enabling reconstruction of a 360 degree view of the first participant's 102 head, even if the camera 124 only captures a front elevation view of the first participant's 102 face. In at least some example embodiments the system 100 may also image other parts of the first participant's 102 head (e.g. the sides, back, and/or top of the head), and other parts of the first participant's 102 body (e.g. the neck and shoulders).

The output of the artificial neural network is sent to the first display device 112; in FIG. 1, the first display device 112 is a headset worn by the second participant 104. The first display device 112 receives the data output of the artificial neural network from the cloud infrastructure 114 and projects a holographic projection 108 of the first participant 102 for viewing by the second participant 104.

Communication between the first video acquisition device 110 and the cloud infrastructure 114 is performed via the first video data stream 116 and the first management data stream 118, while communication between the cloud infrastructure 114 and the first display device 112 is analogously performed via the second data stream 120 and the second management data stream 122. The contents of the various data streams 116, 118, 120, 122 are described further below.

Each of the first video acquisition device 110, first display device 112, and one or more servers comprising the cloud infrastructure 114, comprises at least one processor communicatively coupled to a computer memory that has stored on it computer program code executable by that at least one processor such that, when that at least one processor executes that computer program code, the system 100 collectively performs the functionality described herein. This implementation includes, for example, execution by a neural or artificial intelligence accelerator. More particularly, the system 100 collectively implements the actions and subsystems described below.

The first video acquisition device 110 comprises an input processing subsystem, which itself comprises a data access subsystem, a preprocessing subsystem, and a stream sender subsystem. The data access subsystem reads the 2D video stream from the camera 124 and relays the 2D video stream to the preprocessing subsystem. The preprocessing subsystem re-scales, synchronizes, and de-noises the 2D video stream. The stream sender subsystem forms the first video data stream 116 and sends the first video data stream 116 to the cloud infrastructure 114. The first video data stream 116 comprises the following channels:

an audio channel, comprising sound data obtained using the first computer's 110 microphone;

a video channel, comprising the 2D video stream; and a metadata channel, comprising additional data related to the electronic communication such as head position and head rotation data, and gaze direction and eye blink data that the cloud infrastructure 114 uses for, among other things, gaze reconstruction of the first participant 102.

In at least some other embodiments in which the first video acquisition device 110 also captures depth data (e.g. using a depth sensor or stereo camera), the first video data stream 116 may also comprise a depth data channel for transmitting that depth data. More generally herein, 2D video data may be replaced with 2.5D video data unless otherwise indicated to create additional embodiments.

While the first video data stream 116 comprises substantive content used to create the holographic projection 108, the first management data stream 118 is used for call management communications. For example, data comprising part of the first management data stream 118 is used to negotiate, initiate, and end the communication, and also for setup and synchronization purposes.

The cloud infrastructure 114 performs various actions on the first and second data streams 116, 118. More particularly, the cloud infrastructure 114 receives the first and second data streams 116, 118; performs call management, including authentication and configuration of the call; performs 2D-to-3D (or 2.5D-to-3D, as referenced above) reconstruction of the first participant 102; performs texture reconstruction; performs eye area deocclusion; performs 3D processing of meshes and voxels; and outputs the data suitable for 3D displaying of the first participant 102 ("3D data") to the first display device 112. The cloud infrastructure 114 performs these actions with various subsystems, as described below and as depicted in FIGS. 6A and 6B.

Figure 6A:
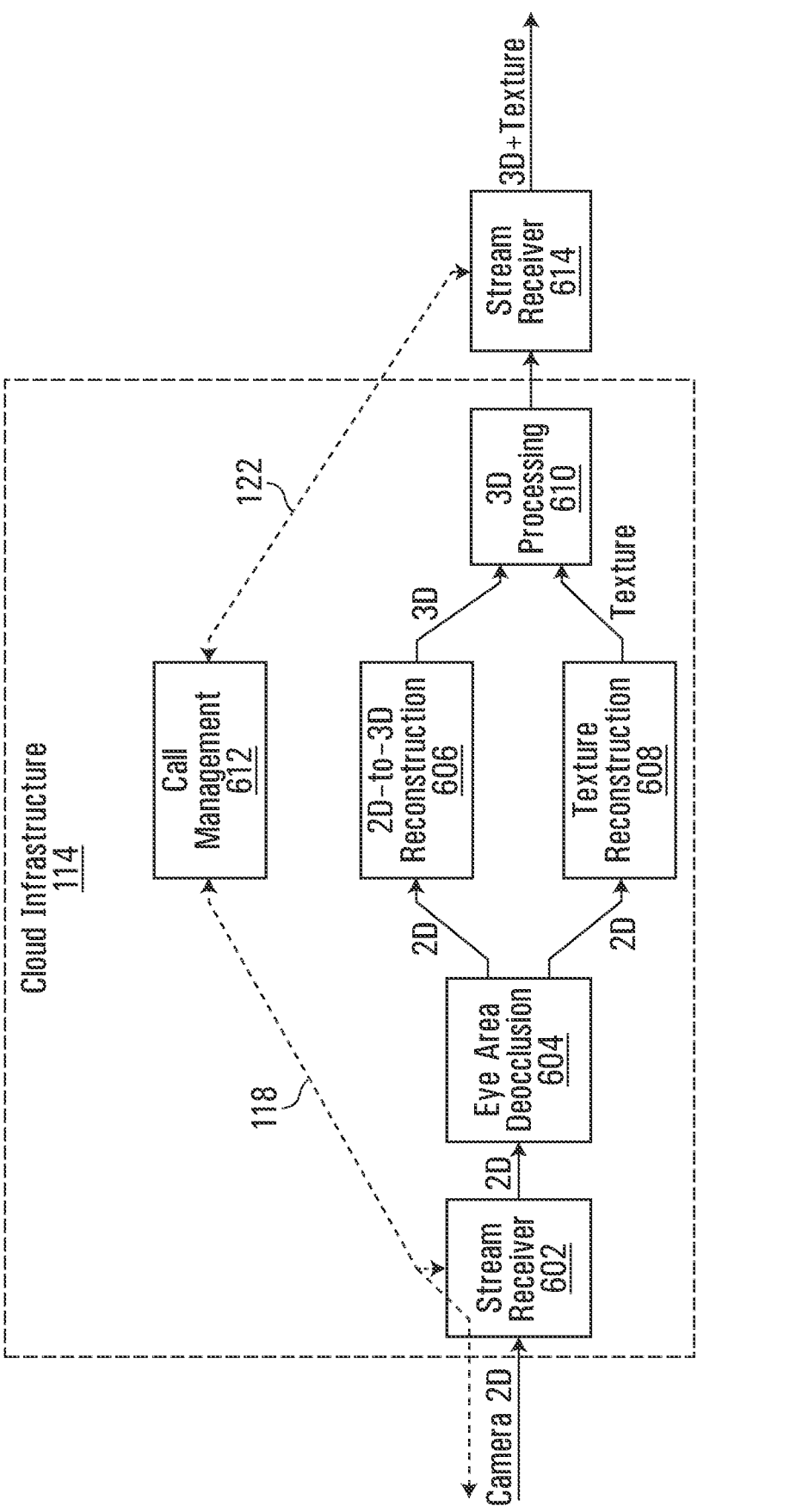
FIGS. 6A and 6B each depicts a block diagram of cloud infrastructure comprising part of the system of FIGS. 1 to 3, communicative with a stream receiver subsystem on a display device, according to additional example embodiments.

More particularly, in FIG. 6A, a stream receiver subsystem 602 receives the 2D video data from the first video data stream 116 and outputs that 2D video data to an eye area deocclusion subsystem 604. The eye area deocclusion subsystem 604 sends 2D video data in parallel to a 2D-to-3D reconstruction subsystem 606 and to a texture reconstruction subsystem 608. The 2D-to-3D reconstruction subsystem 606 outputs 3D data, and the texture reconstruction subsystem 608 outputs texture data in 2D, and both the texture data and 3D data are sent to a 3D processing subsystem 610. The 3D processing subsystem 610 sends 3D and texture data, together with related data as discussed below, to a stream receiver subsystem 614 on the first display device 112. The cloud infrastructure 114 also comprises a call management subsystem 612 that transmits and receives the first management data stream 118 and the second management data stream 122 respectively between the stream receiver subsystem 602 of the cloud infrastructure 114 and the stream receiver subsystem 614 of the first display device 112. Each of the eye area deocclusion subsystem 604, 2D-to-3D reconstruction subsystem 606, and texture reconstruction subsystem 608 is implemented using its own artificial neural network in FIG. 6A.

Figure 6B:
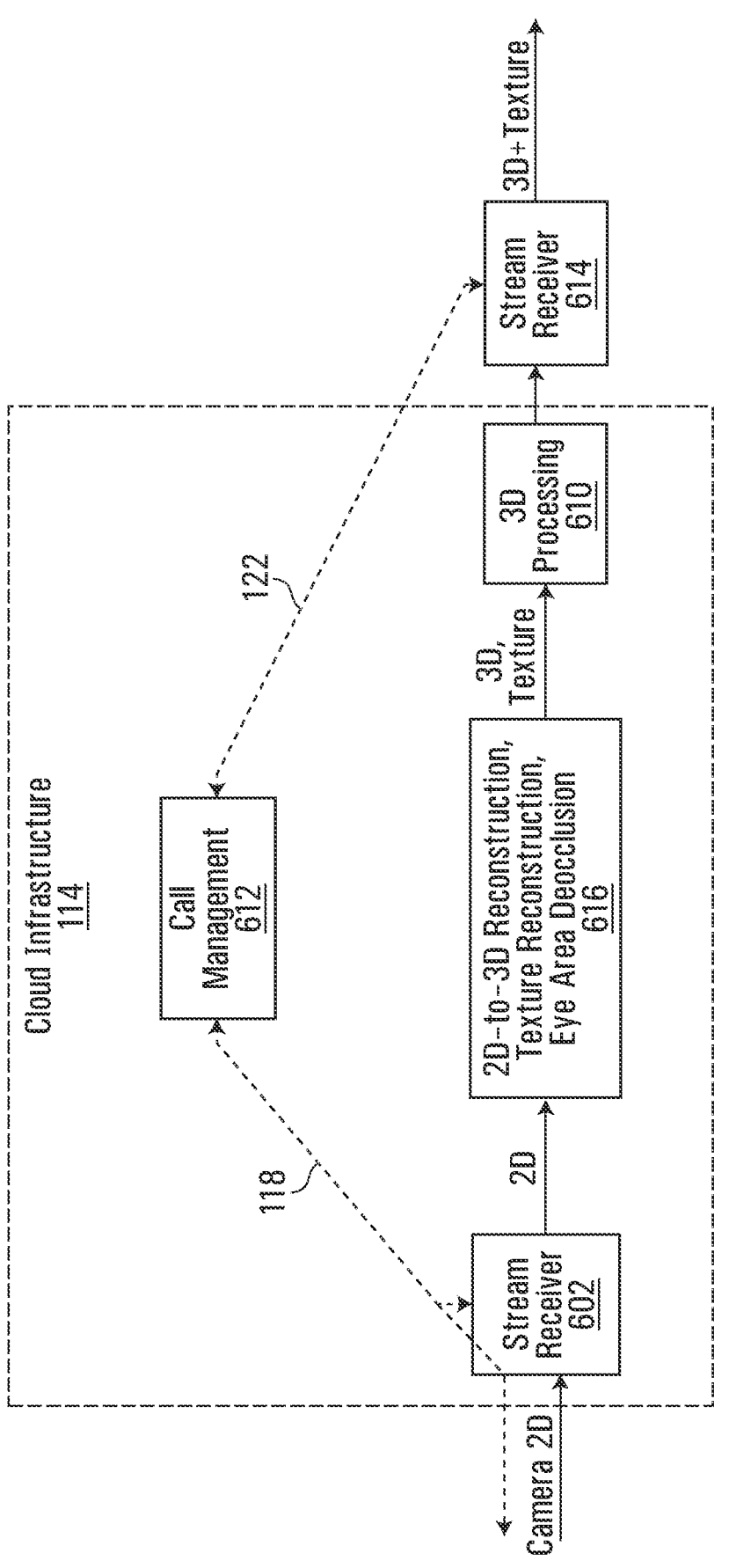

In another embodiment of the cloud infrastructure 114 as shown in FIG. 6B, the stream receiver subsystem 602 receives the 2D video data from the first video data stream and outputs that 2D video data to an integrated subsystem 616 that performs the functionality of the 2D-to-3D reconstruction subsystem 606, texture reconstruction subsystem 608, and eye area deocclusion subsystem 604 as described above. In contrast to the embodiment of FIG. 6A, this integrated subsystem may be implemented using a single artificial neural network. The integrated subsystem 616 outputs textured, 3D data to the 3D processing subsystem 610, which sends that data to the stream receiver subsystem 614 on the first display device 112 as in FIG. 6A. Also as in FIG. 6A, the call management subsystem 612 of the cloud infrastructure 114 handles call management by communicating the management data streams 118, 122 with the stream receiver subsystems 602, 614.

The functionality of the various subsystems 602, 604, 606, 608, 610, 612, 616 is discussed further below.

The call management subsystem 612 is responsible for initiating the call between the participants 102, 104. In contrast with 2D video conferencing, the call management subsystem 612 manages the position of the first conference participant 102 in a 3D virtual embodiment 318 (shown in FIG. 3) into which the first display device 112 projects the holographic projection 108.

The stream receiver subsystem 602 is responsible for receiving the data streams 116, 118 from the first video acquisition device 110.

The 2D-to-3D reconstruction subsystem 606 may comprise a CNN that is trained to output data enabling reconstruction of a 3D representation of the first participant 102 from the 2D or 2.5D video stream using volumetric regression. More particularly, the CNN is trained to reconstruct the 3D data that is missing from the 2D or 2.5D input. In at least some example embodiments, the CNN is based on that described in Aaron S. Jackson, Adrian Bulat, Vasileios Argyriou, and Georgios Tzimiropoulos, "Large Pose 3D Face Reconstruction from a Single Image via Direct Volumetric CNN Regression", arXiv:1703.07834v2 [cs.CV], 8 Sep. 2017 ("Jackson"), the entirety of which is hereby incorporated by reference. The CNN performs a direction-aligned transformation of the 2D raster of pixels received from the first video acquisition device 110 into a 3D space (e.g. a raster of voxels or depth map).

In at least some example embodiments, the CNN of Jackson may be modified to perform 3D convolutions. For a 3D convolution, multiple 2D input channels of data are merged into a single 3D object, and a convolution is performed on that object. For example, three 256×256 RGB channels can be merged into a single RRGGBB 256×256×6 object. The 2D video stream data (e.g. the RGB channels) may be converted into the 3D data stream, and that 3D data stream may be the input to the CNN. The CNN then performs 3D convolutions on that 3D data (e.g. 3×3×3 convolutions). In at least some other example embodiments, multiple layers of 2D feature maps may be obtained from parallel 2D convolution branches within the CNN (e.g. seven 64-channel 58×58 branches). These branches are merged into a single 3D layer (e.g. a single 64-channel 58×58×7 layer) that can be further processed with 3D convolutions (e.g. 3×3×3 convolutions). Applying 3D convolutions in this manner enables better reconstruction of the 3D representation of the first participant's 102 face on the output from the CNN.

Additionally, in at least some example embodiments the CNN used may be based on an Alexnet CNN, plain RES-net CNN, or U-net CNN, as respectively described in Alex Krizhevsky, Ilya Sutskever, and Geoffrey E. Hinton, "ImageNet Classification with Deep Convolutional Neural Networks", NIPS '12: Proceedings of the 25th International Conference on Neural Information Processing Systems—Volume 1, December 2012, pp. 1097-1105; Kaiming He, Xiangyu Zhang, Shaoqing Ren, and Jian Sun, "Deep Residual Learning for Image Recognition", arXiv: 1512.03385v1 [cs.CV], 10 Dec. 2015; and Olaf Ronneberger, Philipp Fischer, and Thomas Brox, "U-Net: Convolutional Networks for Biomedical Image Segmentation", arXiv:1505.04597v1 [cs.CV], 18 May 2015, the entireties of all of which are hereby incorporated by reference. These CNNs are simpler than that described in Jackson, permitting faster inference rates while preserving quality of transformation in certain embodiments.

In at least some other example embodiments, the CNN is based on Phillip Isola, Jun-Yan Zhu, Tinghui Zhou, and Alexei A. Efros, "Image-to-Image Translation with Conditional Adversarial Networks", arXiv:1611.07004v3 [cs.CV], 26 Nov. 2018 ("Isola"), the entirety of which is hereby incorporated by reference. In these example embodiments, the CNN of Isola is modified by adding a depth map channel to the RGB channels of the 2D video stream that are input to the CNN. The depth channel is aligned with the RGB channels; in other words, each of the red, green, blue, and depth channels are of the same field of view. The RGB data is transformed into a 3D texture space, such as cylindrical coordinates, spherical coordinates, and/or Cartesian coordinates, in which depth is represented for the whole visible portion (e.g. head, or the head and a top part of the torso) of the first participant 102 being imaged. Different coordinate spaces may be used for various parts of the body; for example, spherical coordinates may be used for a participant's head outside of the face, cylindrical coordinates may be used for a person's upper torso, and Cartesian coordinates may be used for the front of the person's face. While the CNN of Isola is a generative adversarial network ("GAN"), in these example embodiments it is performing a supervised-mode task, and accordingly can be simplified to a simpler type of supervised network, including by downscaling its architecture to Alexnet or plain RES-net. In at least some example embodiments, GAN-mode operation may be mixed with supervised-mode operation in a single network by weighting GAN-mode and supervised-mode contributions (e.g. when the discriminator-contribution is weighted at zero, the entire CNN behaves as a supervised-mode network).

In at least some example embodiments, the texture reconstruction subsystem 608 reconstructs color information for portions of the holographic projection 108 that are not depicted in the 2D data in the first video data stream 116. The artificial neural network used for texture reconstruction may be based on the CNN described in Isola. The CNN receives as input the 2D image data from the camera 124 and outputs data representing 2D color texture for the coloring of the 3D volume output by the 2D-to-3D reconstruction subsystem 606. The output of texture reconstruction subsystem 608 is given in suitable coordinates, such as cylindrical, spherical, or another suitable 3D texture space to enable the first display device 112 to generate the holographic projection 108. As described above, while in FIG. 6A the texture reconstruction subsystem 608 and 2D-to-3D reconstruction subsystem 606 are separate artificial neural networks, in FIG. 6B the CNN described in Isola is used for 3D reconstruction, the same CNN can be used to concurrently perform texture reconstruction resulting in the integrated subsystem 616.

In at least some different example embodiments, the CNN of Jackson may be analogously used to concurrently perform 3D reconstruction and texture reconstruction. For example, the CNN of Jackson may be trained to output data in the form of voxels that not only represent whether a voxel is part of the 3D reconstructed face or not, but also RGB values for that voxel to represent that voxel's color. In at least some embodiments, all reconstructed voxels (e.g. voxels representing head and torso) comprise RGB values; in at least some other example embodiments, only a portion of the reconstructed voxels (e.g. voxels for the surface of the holographic projection's 108 head) also comprise the color information.

In at least some other embodiments, different types of artificial neural networks may be used for 3D reconstruction and texture reconstruction. For example, the CNN of Isola may be used for 3D reconstruction (as a depth map reconstruction), and the CNN of Jackson may be used for texture reconstruction (as an RGB voxels reconstruction).

In at least some example embodiments, the camera 124 may comprise a depth sensor that generates 2.5D images of the first participant 102 in RGBD format. This depth data allows a cylindrical projection, or hybrid flat and cylindrical projection, of the image represented by the 2D RGB channels into the object space, which allows for better 3D reconstruction of parts of the face not depicted in the 2D image.

More particularly, transforming the face of the first participant 102 into the object space helps to ensure a fixed and centered frontal view of all input images in the training data set for the artificial neural network, allowing for smaller and faster artificial neural networks than when training is performed using uncentered images from the world space. For example, in at least some example embodiments the fixed and centered frontal view in the object space permits volumetric reconstruction without using an artificial neural network by direct filling of areas missing in the 2D image captured by the camera 124 with corresponding areas from complete 3D reference models of the first participant 102 obtained in advance. For example, missing volumes in a 2D image of the first participant's 102 face may be filled using samples taken from corresponding areas of complete 3D reference models. This is feasible because the 3D contours of a person's head does not change significantly during a call; rather, facial expressions and changes in lighting can result in significant changes of texture.

Figures 7A, 7B, 7C, 7D:
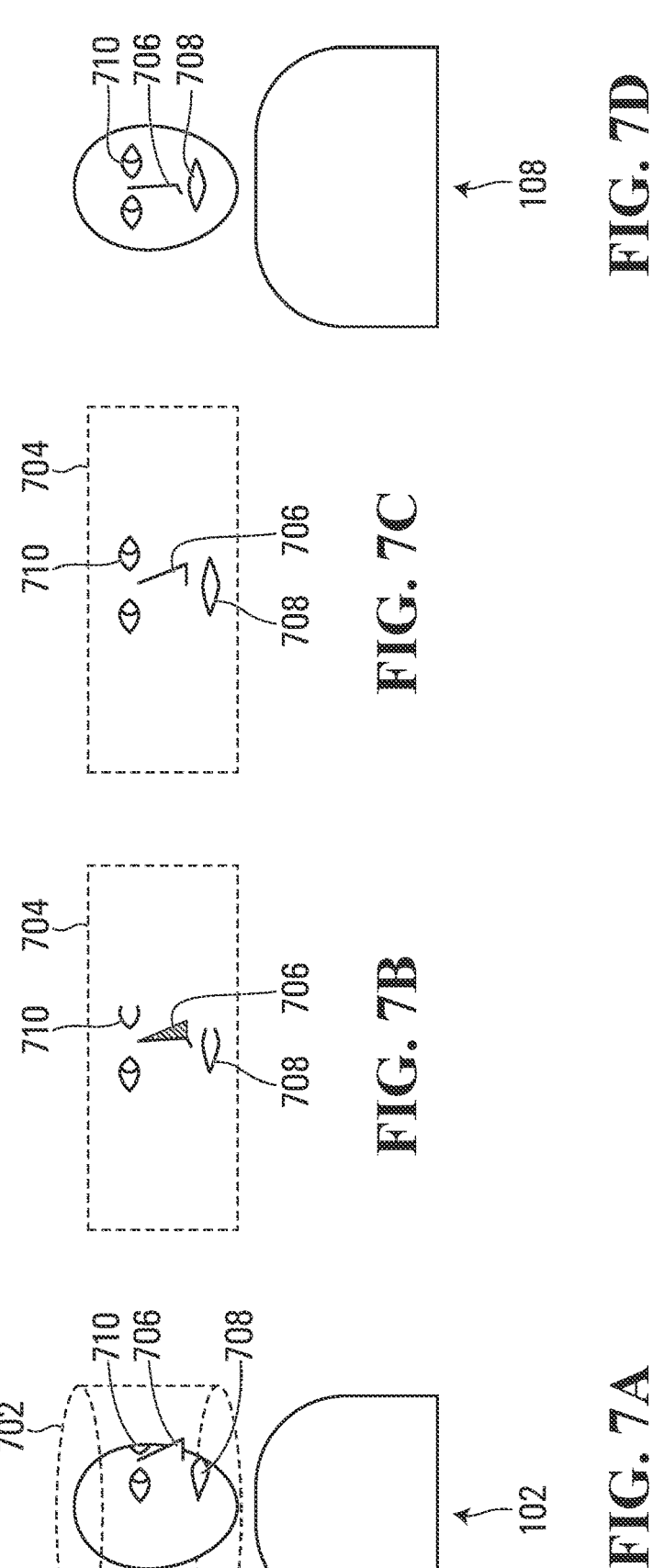
FIGS. 7A-7D and 8 represent texture reconstruction being performed on a conference participant using the system of FIGS. 1 to 3 according to additional example embodiments.

FIGS. 7A-7D depict a combined 2D-to-3D and texture reconstruction, in which the reconstruction comprises a transformation to the object space, being performed on the first participant's 102 face using the integrated subsystem 616, according to an example embodiment. FIG. 7A depicts the first participant 102 as seen by the camera 124 in the world space prior to any reconstruction. The first participant's 102 head is rotated such that only the right side of the first participant's 102 nose 706, mouth 708, and left eye 710 are visible to the camera 124. Without 3D and texture reconstruction, the second participant 104 would accordingly not see the left side of the first participant's 102 nose 706, mouth 708, or left eye 710 in their holographic projection 108 (i.e. were the second participant 104 to move their head to attempt to look at the left side of the nose 706, mouth 708, or left eye 710 without reconstruction there would be nothing there).

The preprocessing subsystem on the first video acquisition device 110 obtains the 2D (or 2.5D) image and cylindrically projects it on to a virtual cylinder 702 surrounding the first participant's 102 head in the world space. The result of this projection is shown in FIG. 7B, which shows the projected face in an object space 704. As only the right side of the nose 706 was captured by the camera 124, the projection of FIG. 7B correspondingly only shows the right side of the nose 706. Similarly, as only the right side of the left eye 710 and right side of the mouth 708 are captured by the camera 124, the left side of the left eye 710 and left side of the mouth 708 are not visible in FIG. 7B. The areas of the face hidden from the camera 124 in FIG. 7A are present in FIG. 7B but undefined.

In at least some example embodiments, the 2D projection of FIG. 7B serves as an-input to one or more artificial neural networks for 2D-to-3D reconstruction and texture reconstruction. In order to fill the missing areas of the projection, coordinates defining those missing areas can be fed into one or more artificial neural networks as an additional channel alongside the RGB channels, for example, of the 2D projection. Alternatively, the RGB channels without the additional channel may be an input to the artificial neural network for texture reconstruction; for example, the missing areas in the RGB channels may be colored a suitable color (e.g. black or gray) and used as an input to the artificial neural network. For texture reconstruction, the artificial neural network may be trained to perform texture reconstruction using inpainting. The projection may be an input to the integrated subsystem 616 of FIG. 6B, or copies of the projection may respectively be an input to the 2D-to-3D reconstruction subsystem 606 and texture reconstruction subsystem 608 of FIG. 6A. As another example, any hidden areas of the 2D projection may have a 3D reconstruction performed with corresponding areas from a 3D reference model of the first participant 102, as discussed above; this may be done without an artificial neural network. Regardless, following reconstruction the image of FIG. 7C is obtained. In FIG. 7C, the left side of the nose 706, left side of the mouth 708, and left side of the left eye 710 have had their volume and texture reconstructed and appear in full. Following processing by the 3D processing subsystem 610, the resulting 3D data depicts a 3D model with the reconstructed left side of the nose 706, left side of the left eye 710, and left side of the mouth 708 visible as shown in FIG. 7D.

The eye area deocclusion subsystem 604 performs eye area deocclusion when the 2D video data captured by the camera 124 excludes the eyes of the first participant 102. For example, the first participant 102 may be wearing a headset (not shown in FIG. 1, and shown in FIGS. 2 and 3 as the second display device 214), which hides the first participant's 102 eyes and the area of the participant's 102 face surrounding the eyes (collectively, the "eye area") from the camera 124. As described above, the eye area deocclusion subsystem 604 may comprise its own artificial neural network upstream of the 2D-to-3D reconstruction subsystem and texture reconstruction subsystem 608, or may be part of the integrated subsystem 616.

In at least some example embodiments, the data input to the eye area deocclusion subsystem 604 may further comprise metadata comprising gaze direction information, which may be obtained, for example, using a front camera of a phone or a camera on a headset positioned to record gaze. In these example embodiments, the eye area deocclusion subsystem 604 may adjust the gaze of the eyes in the reconstructed eye area accordingly.

Regardless of the particular artificial neural network implementation, training of the 2D-to-3D reconstruction subsystem 606 uses data sets comprising good quality pairs of 2D photos of individuals and aligned 3D scans of them taken concurrently as training pairs; the artificial neural network is then trained using supervised learning. For example, the 2D photos and 3D scans are taken within a sufficiently close time together such that the individuals are in substantially identical poses in both the photos and scans (e.g. less than 100 ms apart); are not overly noisy; depict the individuals in all lighting conditions in which the first participant 102 is expected to be seen; and depict the individuals showing all the various facial expressions that the first participant 102 is expected to express. In at least some example embodiments, training is performed using 2D and 3D training video pairs as opposed to static image pairs. An example training data set comprising video session pairs may comprise several pairs of video sessions per individual, using a reasonable number (e.g. hundreds or thousands) of people. The different video pairs comprising the training data set represent different scenarios covering the various emotions, poses, movements, and lighting that the first participant 102 is expected to be seen in when the system 100 is in use.

For example, training data may be obtained by a multi-view scanner in which time-synchronized cameras concurrently record RGB or RGBD images of an individual's head from multiple angles, which images are then stitched together to form a 3D image of the individual's entire head without any holes or gaps in the 3D image. This stitching may be done, for example, using 3D modelling as described in Mildenhall, B. et al., NeRF: Representing Scenes as Neural Radiance Fields for View Synthesis, arXiv: 2003.08934 [cs.CV], the entirety of which is hereby incorporated by reference herein. From that 3D image, training image pairs for neural network training are obtained, which may be used to train one or more neural networks to perform texture and depth completion in an image (or images) with and without holes. For example, when training a network to perform texture completion, a training image pair may comprise a 2D/2.5D image comprising the texture with holes, and a corresponding 3D image of the texture without holes. The holes may result from a 3D reconstruction based on 2D or 2.5D images. Alternatively, both training image pairs may be 3D images, and the holes may be generated in one of the training image pairs by changing the viewing angle of a 3D image to an angle where data is missing and a hole is consequently present.

As another example, training data may be obtained by having an individual record a video (e.g. in RGB or RGBD) of themselves using a single camera, with the different views comprising part of the video being respectively obtained from multiple angles and/or with the individual showing different facial expressions. The videos are then stitched together and/or 3D volumetric modelling is used to create a 3D image without any holes or gaps. This stitching may be done, for example, using 3D modelling as described in Mildenhall, B. et al., NeRF: Representing Scenes as Neural Radiance Fields for View Synthesis, arXiv:2003.08934 [cs.CV]. The individual may record videos using a stand-alone camera apart from the system 100; alternatively or additionally, videos captured by the first video acquisition device 110 when the individual was using the system 100 may be used to generate training data. As an alternative to videos, individual images may be used in at least some embodiments.

Artificial neural network training is done for 2D-to-3D reconstruction or 2.5D-to-3D reconstruction, depending on what type of input data is to be used in conjunction with the artificial neural network, to enable the artificial neural network to function using 2D or 2.5D input data. For 2D-to-3D reconstruction with RGB input, the RGB channels are input to the artificial neural network for reconstruction. For 2.5D-to-3D reconstruction with RGBD input, the RGBD channels are input to the artificial neural network for reconstruction. The cloud infrastructure 114 may comprise one or more artificial neural networks trained to perform 2D-to-3D reconstruction using RGB input data, and another one or more artificial neural networks trained to perform 2.5D-to-3D reconstruction using RGBD input data. The cloud infrastructure 114 may receive the RGB input data and the RGBD input data from different computers or from the first video acquisition device 110 at different times.

In at least some example embodiments in which the system 100 comprises the eye area deocclusion subsystem 604, the data used for artificial neural network training is customized to enable the artificial neural network to perform eye area deocclusion. For example, an artificial neural network for performing eye area deocclusion can be trained using supervised learning in which an input and output training image pair respectively comprise a 2D or 2.5D image of a person with the eye area occluded (e.g. masked out with a rectangular mask) and the corresponding unoccluded 2D or 2.5D image. For the embodiment of FIG. 6A in which eye area deocclusion is performed prior to texture reconstruction and 3D reconstruction, the training image pairs may comprise 2D or 2.5D images. For the embodiment of FIG. 6B in which eye area deocclusion is performed concurrently with texture reconstruction and 3D reconstruction, the training image pairs may comprise a 2D or 2.5D image as input and a 3D reconstruction as output.

In at least some example embodiments, training the artificial neural network used to implement the texture reconstruction subsystem 608 is performed using image pairs in which the image of the pair representing input is a 2D RGB image, and the image of the pair representing output is a 2D image in an appropriate projection (e.g. cylindrical or spherical).

The 3D processing subsystem 610 maps the outputs of the artificial neural networks described above from voxels or a depth map representation to a representation compatible with the first display device 112. Example suitable representations comprise a mesh presentation, a point-cloud representation, and a depth map representation. In the embodiment of FIG. 6A, the 3D processing subsystem 610 receives inputs separately from the 2D-to-3D reconstruction subsystem 606 and the texture reconstruction subsystem 608, and accordingly aligns those inputs with each other. For example, alignment between the 3D data output by the 2D-to-3D reconstruction subsystem 606 and the 2D data output by the texture reconstruction subsystem 608 may be aligned by ensuring proper alignment of one or more facial landmarks, such as the nose.

The output of the 3D processing subsystem 610 is sent to the first display device 112 as the second data stream 120. The second data stream 120 comprises the following channels:

an audio channel;

a volumetric data channel, comprising full-featured 3D data or reconstructed 2.5D data in a suitable format for the first display device 112, such as a mesh representation, point-cloud representation, or depth map representation as discussed above;

a color texture channel, comprising texture data to be applied on to the volumetric data contained in the volumetric data channel; and a metadata channel, comprising information describing head position and angle of rotation, spatial position data, gaze direction, and facial landmarks of the first participant 102.

The first display device 112 receives the second data stream 120 and processes it using the stream receiver subsystem 614, a 3D and texture processing subsystem, and a display subsystem. The stream receiver subsystem 614 collects the second data and management data streams 120, 122 from the cloud infrastructure 114; the 3D and texture processing subsystem performs any final corrections or transformations of the 3D image data received from the cloud infrastructure 114 into a format suitable for display by the first display device 112; and the display subsystem loads the 3D and texture data and projects the holographic projection 108 for the second participant 104.

Using the system 100 of FIG. 1, the holographic projection 108 is in at least some example embodiments updated in real-time and photo-realistic. Real-time presentation is achieved by using efficient eye area deocclusion, 2D-to-3D reconstruction, texture reconstruction, and 3D processing, and/or integrated subsystems 604, 606, 608, 610, and 616 with low latency (e.g. a cumulative latency of no more than 500 ms), high throughput (e.g. a frame rate of at least 15 fps at a resolution of 256×256×256 or higher), and sufficiently powerful hardware (e.g. an Apple™ Neural Engine™ in the case of the first video acquisition device 110, or an array of parallelized GPUs in the case of the cloud infrastructure 114). Furthermore, efficient data formats (e.g. H.264 or VP9 for 2D data), resolutions (e.g. at least 640×480 for 2D data, and at least 256×256×256 for 3D data), and streaming methods (e.g. in accordance with the WebRTC™ project) also contribute to real-time presentation of the holographic projection 108. Photo-realism is facilitated by using a 2D or 2.5D-to-3D reconstruction method based on translating pixels to voxels or a depth map as opposed to an avatar-based approach in which facial expressions are represented as feature vectors of using selected face landmarks.

Generating a 3D reconstruction in respect of FIG. 1 generally comprises capturing a 2D or 2.5D image as a raster using the first video acquisition device 110, performing raster-to-raster corrections and transformations (e.g. transforming between the world space and object space, from 2D to 3D, from voxels to point-cloud, from a 2D image lacking texture to a 2D image comprising texture) in the first video acquisition device's 110 preprocessing subsystem, the cloud infrastructure 114, and the first display device's 112 3D and texture processing subsystem, and displaying the raster as the holographic projection 108. In contrast to an avatar-based approach in which face landmarks of a selected portion of a 2D or 2.5D image are transferred to a pre-existing avatar and used to morph the avatar, the transformation as contemplated in at least some embodiments uses all the image data in the selected part(s) of a 2D or 2.5D image in a transformation that reconstructs a 3D object.

Figure 2:
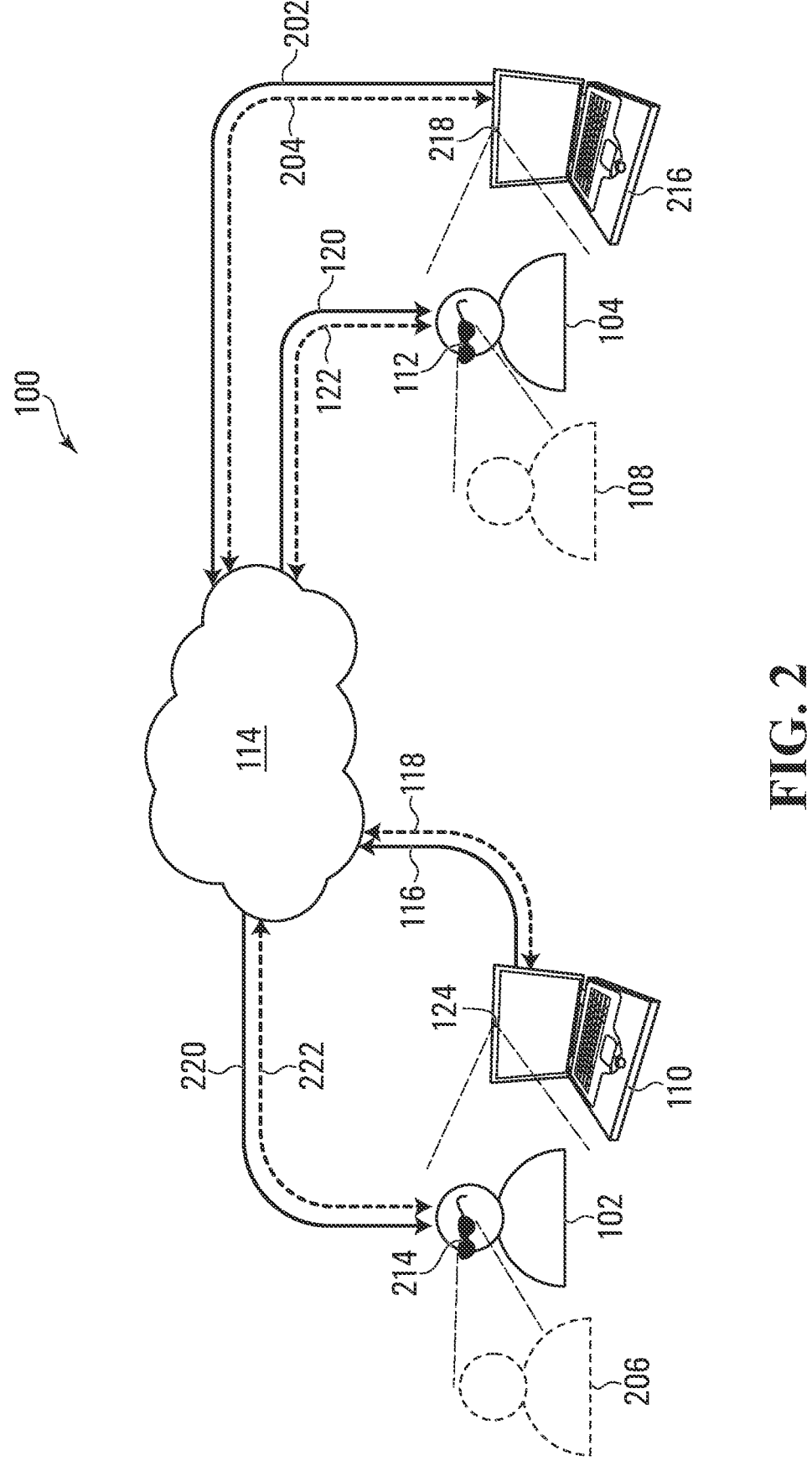

Referring now to FIG. 2, another example embodiment of the system 100 for 3D electronic communication is depicted. While the system 100 of FIG. 1 permits one-way holographic communication from the first participant 102 to the second participant 104, the system 100 of FIG. 2 permits bi-directional holographic communication. While the system 100 of FIG. 1 implements a "one way" call from the first participant 102 to the second participant 104, the system 100 of FIG. 2 accordingly performs bi-directional electronic communication by implementing two one-way calls in parallel with each other. This is done by essentially duplicating the equipment used for the one way call of FIG. 1, thereby enabling the first participant 102 to view a holographic projection 206 of the second participant 104.

More particularly, relative to FIG. 1, the system 100 of FIG. 2 further comprises a second video acquisition device 216 comprising a second camera 218, which captures 2D images of the second participant 104. Analogous to the first video acquisition device 110, the second video acquisition device 216 also comprises a data access subsystem, a preprocessing subsystem, and a stream sender subsystem. The second video acquisition device 216 transmits to the cloud infrastructure a third video data stream 202, analogous to the first video data stream 116 sent by the first video acquisition device 110, and bi-directionally communicates with the call management subsystem 612 of the cloud infrastructure 114 using a third management data stream 204 that is analogous to the first management data stream 118 sent and received by the first video acquisition device 110.

The system 100 of FIG. 2 also comprises a second display device 214 worn by the first conference participant 102, with the second display device 214 projecting the holographic projection 206 of the second participant 104. The cloud infrastructure 114 transmits a third data stream 220, analogous to the second data stream 120, to the second display device 214. A third management data stream 222, analogous to the second management data stream 122, between cloud infrastructure 114 and the second display device 214 is used for call management.

Figure 3:
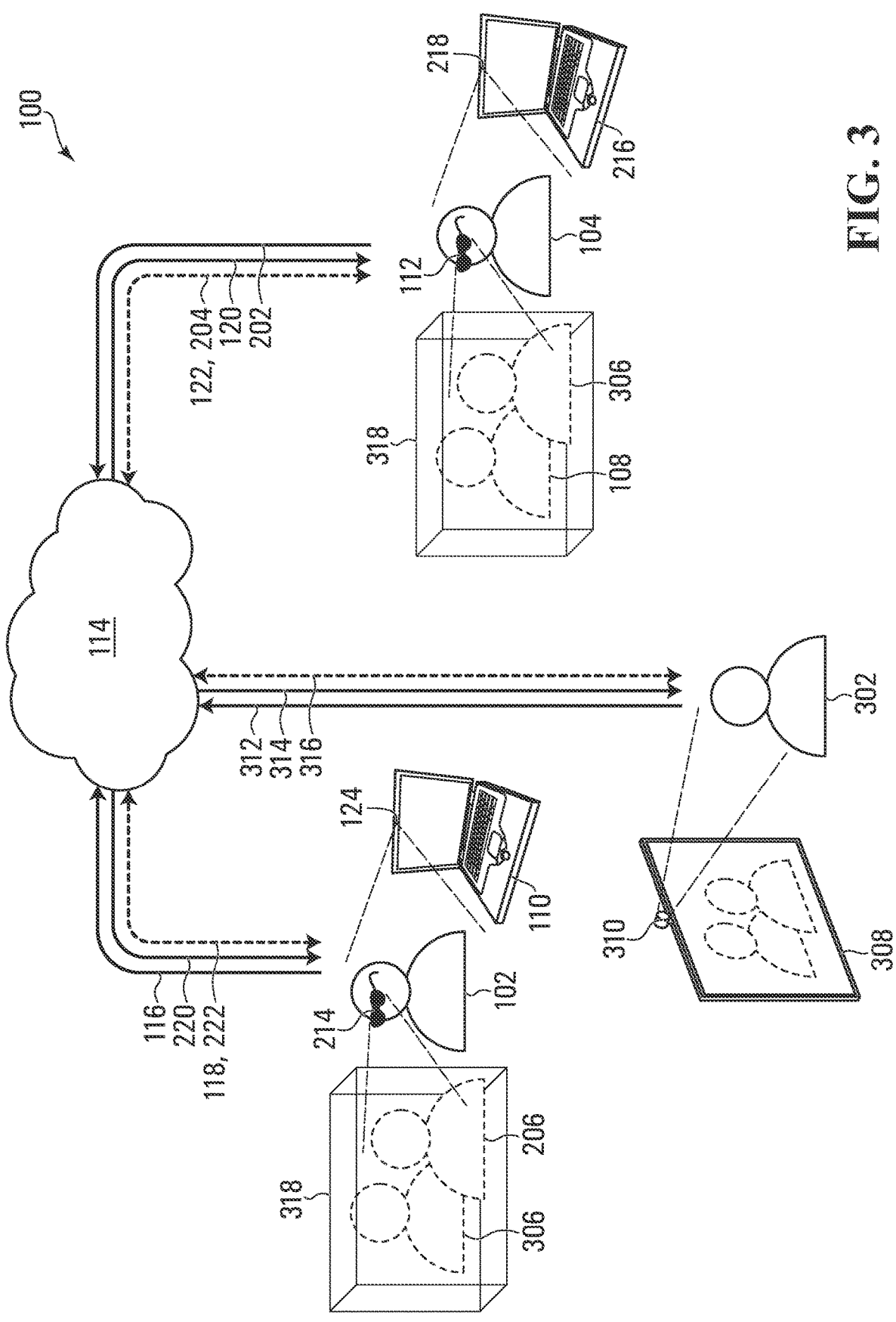
FIG. 3 depicts a system for three-dimensional electronic communication in which three parties are communicating with each other, according to another example embodiment.

FIG. 3 depicts another embodiment of the system 100 for 3D electronic communication in which a third conference participant 302 holographically conferences with the first and second participants 102, 104. Analogous to how the system 100 of FIG. 2 permits two-way communication by doubling the equipment used to implement the system 100 of FIG. 1, the system 100 of FIG. 3 enables three-way communication by tripling the equipment in the system 100 of FIG. 1. Relative to the system 100 of FIG. 2, the system

100 of FIG. 3 accordingly further comprises a third video acquisition device comprising a third camera 310 that captures a 2D video stream of the third participant 302. The third camera 310 transmits a fourth video data stream 312 to the cloud infrastructure 114 and receives a fourth management data stream 316 from the cloud infrastructure 114. The fourth video data stream 312 is analogous to the first and third video data streams 116, 202, and accordingly permits each of the first and second participants 102, 104 to view a holographic projection 306 of the third participant 302. The fifth data stream 314 is analogous to the second and third data streams 120, 220, and accordingly sends textured, 3D data to a third display device 308 in the form of a television that enables the third participant 302 to view 2.5D representations of the first and second participants 102, 104 on a screen. A fourth management data stream 316 collectively represents bi-directional data streams between each of the third video camera 310 and third display device 308 and the cloud infrastructure 114 for call management, and is analogous to the first and third management data streams 118, 222 in respect of the first participant 102 and to the second and third management data streams 122, 204 in respect of the second participant 104.

In contrast to the embodiments of FIGS. 1 and 2, in FIG. 3 each of the first and second participants 102, 104 views two of the holographic projections 108, 206, 306, while the third participant 302 views 2.5D representations based on 3D models of the first and second participants 102, 104. Consequently, the call management data also comprises spatial positioning of each of the projections 108, 206, 306 within the 3D virtual environments 318 of the first and second display devices 112, 214 and the representation of the 3D virtual environment 318 displayed on the third display device 308. The call management subsystem 612 in the cloud infrastructure 114 maintains relative 3D positioning between the holographic projections 108, 206, 306 for each of the 3D virtual environments 318 of the first and second display devices 112, 214 and the representation of the 3D virtual environment 318 displayed on the third display device 308, and transmits that positioning to each of the first through third display devices 112, 214, 308 for their use during holographic projection (for the first and second display devices 112, 214) and 2.5D representation (for the third display device 308). A conference of more than three participants 102, 104, 304 may be organized analogously as shown in FIG. 3. More particularly, each of the fourth and subsequent participants may be treated analogously as any of the first through third participants 102, 104, 302.

Figure 4:
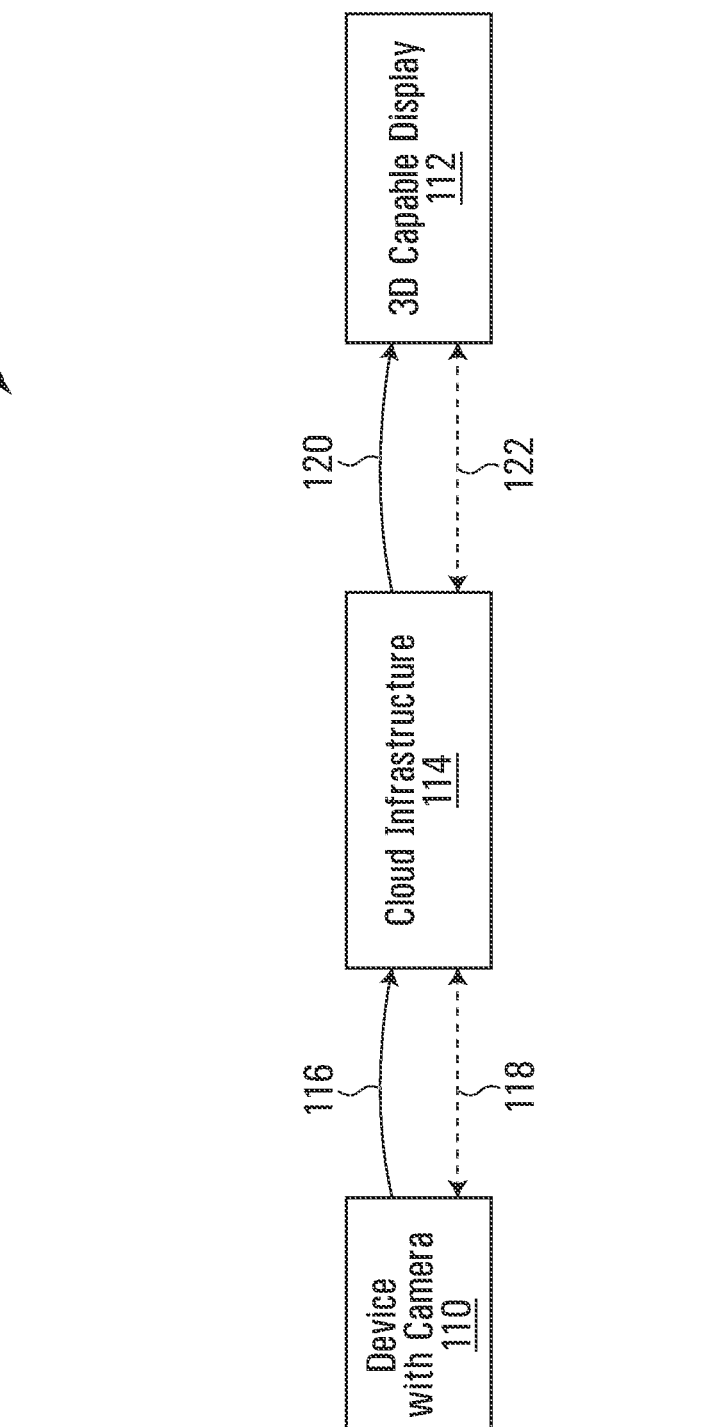
FIGS. 4, 5, and 9 depict block diagrams of a system for three-dimensional electronic communication, according to additional example embodiments.

Referring now to FIG. 4, a block diagram of another embodiment of the system 100 for 3D electronic communication is shown. The system 100 of FIG. 4 comprises a device with a camera such as the first video acquisition device 110, the cloud infrastructure 114, and a 3D capable display such as the first display device 112. As discussed above, the first video data stream 116 transmits video data from the first video acquisition device 110 to the cloud infrastructure 114, the second data stream 120 transmits data from the cloud infrastructure 114 to the first display device 112, and the first and second management data streams 118, 122 bi-directionally transmit call management data between the first video acquisition device 110 and the cloud infrastructure 114, and between the cloud infrastructure 114 and the first display device 112.

The content of the data streams 116, 120 and the tasks performed by the first video acquisition device 110, cloud infrastructure 114, and first display device 112 may change, depending on the particular embodiment. For example, as described above in respect of the example embodiment of FIG. 1, the first video acquisition device 110 comprises the data access subsystem, the preprocessing subsystem, and the stream sender subsystem; the cloud infrastructure 114 comprises the call management subsystem 612, the stream receiver subsystem 602, the 2D-to-3D reconstruction subsystem 606, the texture reconstruction subsystem 608, the eye area deocclusion subsystem 604, the 3D processing subsystem 610, and the stream sender subsystem; and the first display device 112 comprises the stream receiver subsystem 614, the 3D and texture processing subsystem, and the display subsystem. Consequently, the first video data stream 116 comprises 2D (or 2.5D) data, which the cloud infrastructure 114 processes into volumetric video data with color texture that is contained in the second data stream 120.

The functionality performed by the first video acquisition device 110, the cloud infrastructure 114, and the first display device 112 may vary in different embodiments. For example, in an example embodiment in which the first display device 112 comprises sufficiently powerful hardware (e.g. any sufficiently powerful combination of a central processing unit, graphical processing unit, and neural processor) to perform 3D reconstruction itself, 2D-to-3D reconstruction may be shifted from the cloud infrastructure to the first display device 112. For example, the cloud infrastructure 114 may comprise the call management subsystem 612, the stream receiver subsystem 602, the stream sender subsystem, and a 2D processing subsystem for performing basic 2D processing of video data such as rescaling. And, in addition to comprising the stream receiver subsystem 614, 3D and texture processing subsystem, and display subsystem, the first display device 112 may further comprise the 2D-to-3D reconstruction subsystem 606, the texture reconstruction subsystem 608, and the eye area deocclusion subsystem 604 that are found in the cloud infrastructure 114 in the embodiment of FIG. 6A. In this example embodiment, the video data in the first and second data streams 116, 120 is 2D (or 2.5D) data, and is not reconstructed as 3D data until it arrives at the first display device 112.

Conversely, in at least some example embodiments, 3D processing may be performed upstream of the cloud infrastructure 114 at the first video acquisition device 110. In these example embodiments, the first video acquisition device 110 may comprise the data access subsystem, the preprocessing subsystem, and the stream sender subsystem, and may further comprise the 2D-to-3D reconstruction subsystem 606, the texture reconstruction subsystem 608, the eye area deocclusion subsystem 604, and the 3D processing subsystem 610. The cloud infrastructure 114 accordingly comprises the call management subsystem 614, the stream receiver subsystem, and the stream sender subsystem; and the first display device 112 comprises the stream receiver subsystem 610 and the display subsystem. The 3D and texture processing subsystem may be in either the cloud infrastructure 114 or the first video acquisition device 110. As 3D reconstruction is performed at the first video acquisition device 110 in these embodiments, 3D data is transmitted using the first and second data streams 116, 120.

Figure 5:
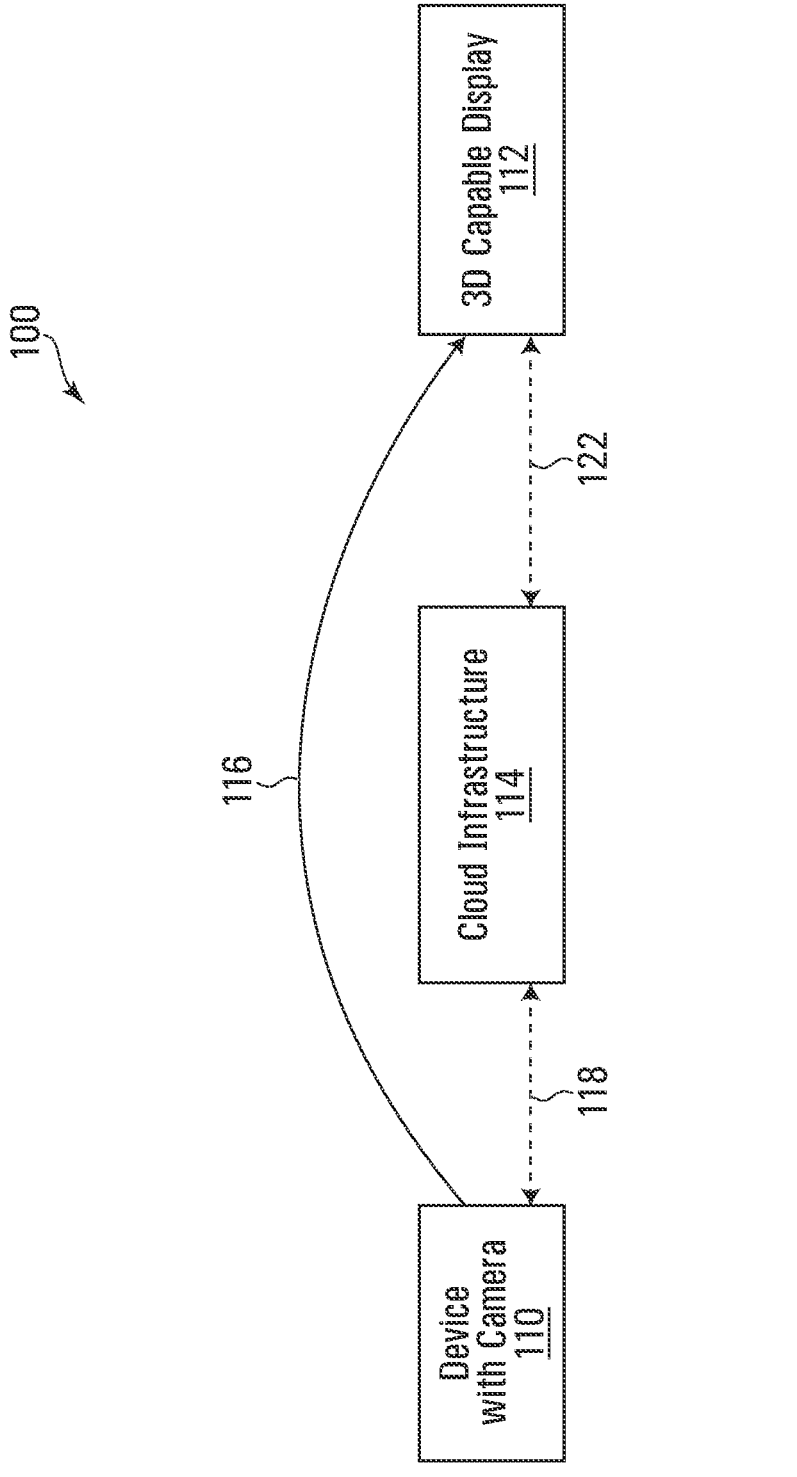

Referring now to FIG. 5, an embodiment of the system 100 in which the first video acquisition device 110 and the first display device 112 communicate on a peer-to-peer basis is shown. In this example embodiment, the cloud infrastructure 114 comprises the call management subsystem 612, and is functionally only responsible for call management as is indicated by the first management data stream 118 being bi-directionally transmitted between the first video acquisi-tion device 110 and the cloud infrastructure 114, and the second management data stream 122 being bi-directionally transmitted between the cloud infrastructure 114 and the first display device 112. As the cloud infrastructure 114 is only responsible for call management, functionality otherwise performed by the cloud infrastructure 114 is shifted to one or both of the first video acquisition device 110 and the first display device 112.

For example, in at least some of the peer-to-peer embodiments, the first video acquisition device 110 comprises the data access subsystem, the preprocessing subsystem, and the stream sender subsystem; and the first display device 112 comprises the stream receiver subsystem 614, the preprocessing subsystem, the 2D-to-3D reconstruction subsystem 606, the texture reconstruction subsystem 608, the eye area deocclusion subsystem 604, the 3D processing subsystem 610, and the display subsystem. Consequently, the first video data stream 116 comprises 2D (or 2.5D) data, which is reconstructed as 3D data at the first display device 112.

Conversely, in at least some other peer-to-peer embodiments, the first display device 112 comprises the stream receiver subsystem 614, the 3D and texture processing subsystem, and the display subsystem; and the first video acquisition device 110 comprises the data access subsystem, the preprocessing subsystem, 2D-to-3D reconstruction subsystem 606, texture reconstruction subsystem 608, eye area deocclusion subsystem 604, 3D processing subsystem 610, and stream sender subsystem. Consequently, the first data stream 116 comprises 3D data.

Image Completion

Figure 8:
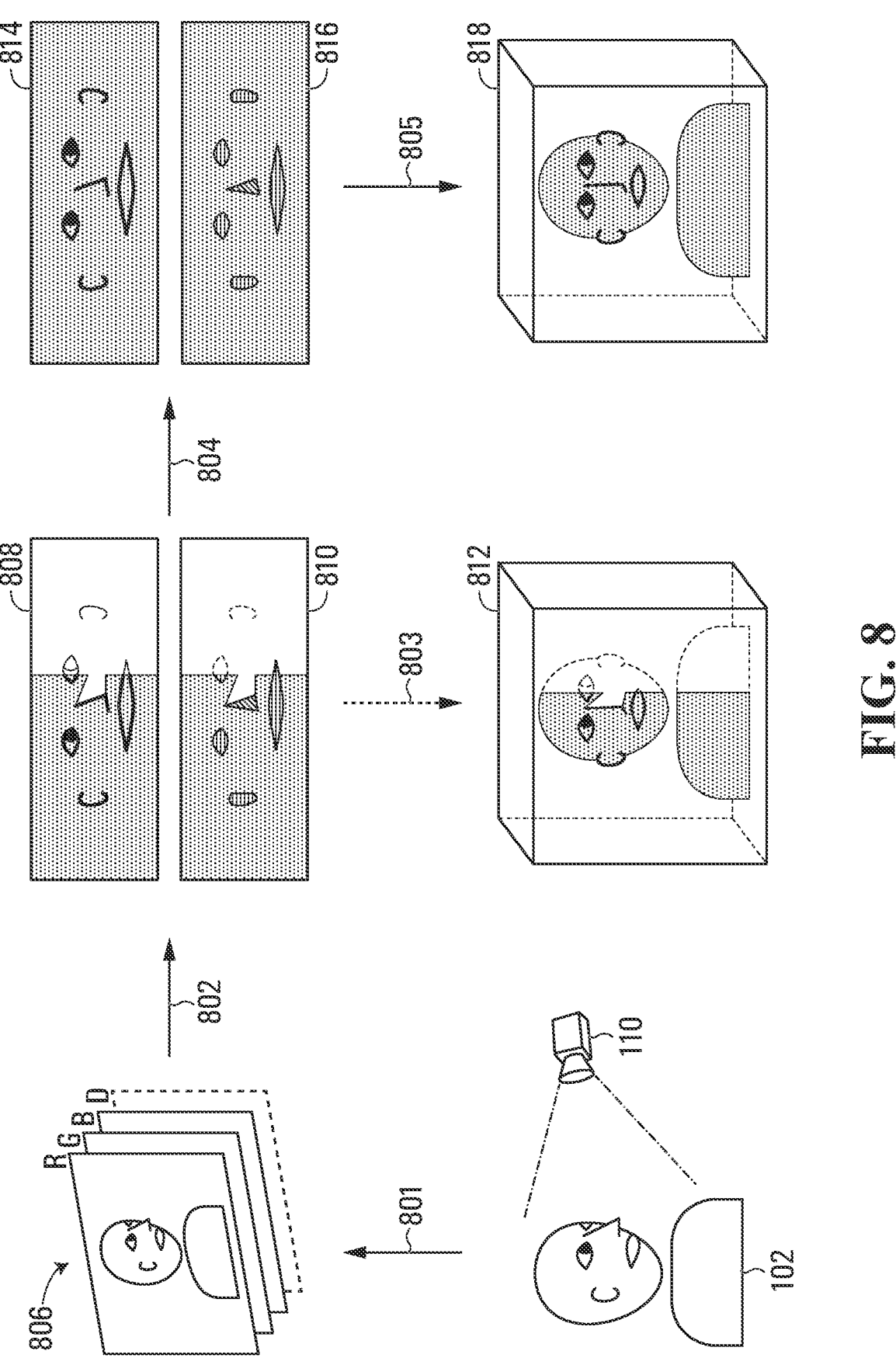

Referring now to FIG. 8, an example process for performing image completion on a 2.5D image acquired of the face of a person, such as the first participant 102, partaking in electronic communication such as a holographic video conference is depicted. "Image completion" refers to filling in missing parts or "holes" of 2.5D image data of the participant's 102 head that cause that image data an incomplete representation of the head such that a complete 3D representation without any missing parts of the head can be generated from that image data. The operations depicted in FIG. 8 may be performed, for example, using the integrated subsystem 616 of the cloud infrastructure 114.

In FIG. 8, the first video acquisition device 110 acquires 2.5D data 806 in the form of a sequence of video frames (arrow 801). The first video acquisition device 110 may comprise, for example, a stereo camera or a 2D camera that further comprises a depth sensor. Each of the video frames of the 2.5D data 806 comprises RGBD channels, with the R, G, and B channels respectively representing red, green, and blue 2D data and the D channel representing depth data. In an alternative embodiment, the video acquisition device 110 may capture only 2D data and depth data may be reconstructed as described above to arrive at the 2.5D data 806. Head alignment data and head segmentation data is also obtained. Head alignment data may comprise head position data (e.g. in Cartesian coordinates) combined with an angle indicating head alignment relative to that position data. In particular, changes in alignment data between consecutive video frames is used for proper rendering. Head segmentation data delineates the separation of the head from the background and from the torso, and may comprise a curve delineating an outline of imaged portions of the head.

Image completion is in some embodiments performed using 2.5D image data that is captured from only certain viewing angles. Accordingly, certain video frames may be filtered out so that completion is not performed on them. For example, video frames depicting extreme view angles of the head (e.g. more than an angle limit, such as 60 degrees off center) or that do not depict a sufficient amount of the face or head may be removed (e.g. less than a face threshold, such as 50% of the face). Frames that are filtered out may be used for image reconstruction despite the fact that reconstructed images based on them may be incomplete.

The 2.5D data 806 is then deterministically projected into an object space (arrow 802), for example as described above in respect of FIGS. 7A-7D above. More particularly, the RGB channels are projected into the object space using the head alignment data and depth data; the head segmentation data may also be used in at least some embodiments. This projection results in a texture object space representation 808; and the D channel is projected into the object space, resulting in a depth object space representation 810. Both object space representations 808,810 have "holes" or missing parts, representing texture or depth data that was not obtained by the video acquisition device 110; see, for example, U.S. Pat. No. 9,904,660, which is incorporated by reference herein. Consequently, a 3D reconstruction 812 generated (arrow 803) based on the object space representations 808,810 is incomplete. Pre-processing (i.e. processing done before completion using neural networks as described below in conjunction with arrow 804) may be performed on the object space representations 808,810. Areas of the object space representations 808,810 close (e.g. within a centimeter) to holes may have lower quality information (e.g. blurriness; color errors) as a result of limitations of the visual and/or depth sensors of the video acquisition device 110. More particularly, steep surface angles and the transition between the participant's 102 head and background represent areas that may be removed and consequently completed using artificial neural networks as described in respect of arrow 804 below. In particular, the transition between the participant's 102 head and background represents a hole because, with the video acquisition device 110 capturing only the front of the participant's 102 head, the entire back of the head represents a hole, with the edge of the head from the perspective of the video acquisition device 110 delineating both the hole and the background. Any small imperfections in head segmentation information can lead to the leaking of background information into the reconstructed 3D image (e.g. the first conference participant's 102 hair may gain a color tint from a wall in the background behind the first conference participant 102). The direct leaking of background into the 3D image is visually unpleasant and perceived as error. To stop this leaking more advanced segmentation can be used. Instead of just depth information-based segmentation or computational model-based segmentation, a combination of both can be used. Removal of the segmentation border can be performed as well, because any lost information will be reconstructed later in the completion process. Similarly, when combining several segmentations of the head, only areas presented in all segmentations can be kept as an output, and any missing portions of the head may be reconstructed later during completion.

Instead of performing a 3D reconstruction based on the incomplete object space representations 808,810, one or more artificial neural networks may be applied (arrow 804) to the object space representations 808,810 to reconstruct them such that the "holes" or missing parts of the representations 808,810 are filled in, thereby performing image completion. Neural networks such as the Pix2Pix generative adversarial network or a convolutional neural network such as AlexNet or U-Net may be used for image completion. The results of completing the incomplete texture and depth object space representations 808,810 are completed texture and depth object space representations 814,816, which may be used to reconstruct (arrow 805) a 3D representation 818 of the participant's 102 face.

Completion may be performed, for example, using a single artificial neural network with four channels input and four channels output, with the four channels representing the RGBD channels. Alternatively, more than four channels may be used for input and/or output, as described further below.

The completed texture and depth object space representations 814,816 may be imperfect reconstructions. For example, particularly along the boundary of reconstructed holes, depth spikes and/or color mismatch may be present. Color mismatch may be addressed by applying, for example, Poisson blending. Depth spikes may be addressed by smoothing or by applying simple thresholding on the depth or depth gradient, or weighted thresholding according to the probability that a depth spike will appear and/or the visual importance of the area. For example, errors may be common when reconstructing the back of the neck by virtue of being in near the ends of the cylindrical representation of the head. However, the back of the neck is a visually unimportant area for electronic communication, so aggressive smoothing may be applied to it or parts of the back of the neck may be removed.

Additionally, while in FIG. 8 the artificial neural network is used to concurrently complete texture and depth, this is not necessary in all embodiments. For example, texture and depth may alternatively be completed separately and independently, and to save computational resources the more computationally expensive neural network-based completion may be reserved for texture completion while relatively less computationally expensive deterministic completion may be used to complete depth.

As mentioned above, more than four channels of data may be input to one or more artificial neural networks for completion. For example, an "alpha channel" may be used to encode the head segmentation data in the incomplete object space representations 808,810 to facilitate completion. In FIG. 8, for example, an alpha channel may delineate the greyed-out portion of the incomplete object space representations 808,810, thereby representing head segmentation information. Additionally or alternatively, an alpha channel may also be used to identify where any holes are in the incomplete object space representations 808,810. For example, a portion of the face adjacent the nose may not be imaged from a certain angle because it is blocked by the nose, resulting in a hole in the incomplete object space representations 808,810; this hole may be represented in the alpha channel in addition to head segmentation information. An alpha channel may, for example, comprise a two-tone picture (e.g. black and white) with one color (e.g. white) representing where the holes and/or head are. Generally speaking, holes may appear in the back of the head by virtue of that portion of the head not being imaged, where this is determined from depth data and head segmentation data, in which the head segmentation data is derived from RGB data; result from geometry of the head (e.g. a portion of the head blocked by another portion of the head such as the nose as described above), where this is determined from depth data and head alignment data, in which the head alignment data is derived from RGB and depth data; or otherwise result from preprocessing.

An alpha channel may similarly be used for depth completion, thus enabling depth completion when depth is input to the neural network with only the RGB channels, or with RGB and Alpha (A) channels. For example, a two-tone picture may be used to indicate portions of the image where depth information is present or absent; alternatively, a particular numeric value (e.g. 0) may correspond with those positions in the image that lack depth data. Depth data may be completed with 2D visual data (e.g. RGBD channels may concurrently be input into a neural network for completion); alternatively, depth data may be completed separately from 2D visual data (e.g. RGB channels may be input into a neural network for completion; and a D channel may be separately entered into a neural network to complete depth apart from completion of the 2D visual data).

Another example of more than four channels of data being used (e.g. more than RGBD) is specifying one or more "normals" (N) channels, which define the direction of normal vectors along the surface to be reconstructed. For example, three normals channels may be specified in conjunction with RGB or RGBD channels, with the three channels representing angles in the x, y, and z directions of the Cartesian coordinate system. In at least some embodiments, for every RGB value, an image with normal information also comprises the normals values; this is in at least some embodiments also done for D and A channels. The normals channel may be input to the artificial neural network for texture (geometry and color) completion. Taking into account the alpha channel and the above examples, example channels that may be input to one or more artificial neural networks together with the normals channel comprise the DN, DAN, RGBN, RGBAN, RGBDN, and RGBDAN channels.

Figures 10A, 10B, 10C:
FIGS. 10A-10C depict example representations of RGB channels (FIG. 10A), depth channel (FIG. 10B), and a normals channel (FIG. 10C), which may be used during image completion, according to an example embodiment.

FIGS. 10A-10C depict example representations of RGB channels (FIG. 10A), depth channel (FIG. 10B), and a normals channel (FIG. 10C).

Additionally, to facilitate skin tone color, texture, and depth matching between completed holes and other parts of the participant's 102 head that were visually imaged, multi-frame completion may be used. In multi-frame completion, the input to the neural network is not derived from only a single video frame but from multiple video frames. This may be done, for example, as follows:
  1. The holes in the incomplete object space representations 808,810 may be filled using data obtained by the video acquisition device 110 when the portion of the participant's 102 head corresponding to the holes was visible to and imaged by the video acquisition device 110. For example, if there are holes in the incomplete object space representations 808,810 corresponding to the left side of the participant's 102 nose, then depth and/or RGB data obtained by the video acquisition device 110 when the left side of the participant's 102 nose was visible may be input to the artificial neural network and used for completion.
  2. Multiple entire frames may be input to the neural network. For example, instead of inputting only the current frame to the neural network, the current frame and several frames selected from the past may be used as input. The past frames may be sampled regularly or irregularly. For example, each of multiple frames may be represented as an RGBD input. Input to the neural network may comprise, for example, certain frames selected based on time and/or characteristics. For example, the input to the neural network may be the RGBD input corresponding to all frames from the last 5 seconds; and/or the past five frames that show head alignment between 0 to 30 degrees, regardless of when those frames were captured. Multiple frames may be input to the artificial neural network used for completion in parallel.

3. Alternatively, the current frame and a frame ("composition frame") generated as an accumulated composition of past frames may be input to the artificial neural network used for completion. For instance, the composition frame can be generated by overlaying those past frames together. In such an overlay, any holes for completion in any one frame may, in at least some embodiments, be transparent. Alternatively, different frames and/or parts of different frames may be differently weighted prior to their being overlaid. For example, more recent frames may be weighted more heavily than frames from further in the past. Additionally or alternatively, the holes in any frames may be semi-transparent to varying degrees of opacity (e.g. anywhere from completely transparent to entirely opaque); for example, while holes for completion may not be completely transparent, they may nonetheless be set to more transparent than, and consequently be weighted less heavily, than parts of frames depicting valid facial imagery.

Figure 9:
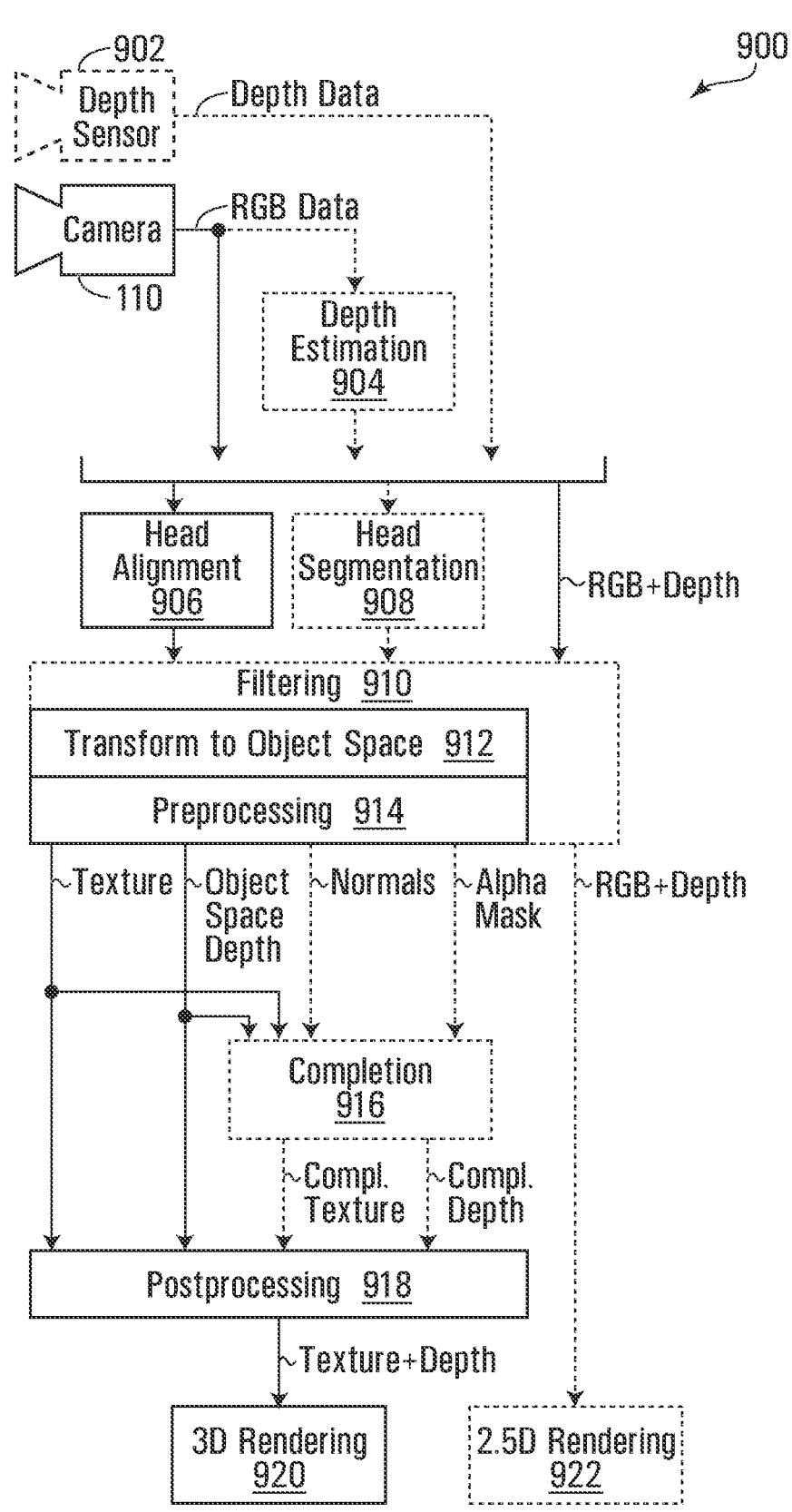

Referring now to FIG. 9, there is shown a block diagram 900 of the system 100 for three-dimensional electronic communication, according to an example embodiment. The block diagram 900 shows an example of the system 100 that comprises the image functionality described above in respect of FIG. 8.

More particularly, the block diagram 900 shows image acquisition being performed using the first video acquisition device 110 and, optionally, a separate depth sensor 902. When the video acquisition device 110 captures 2D video alone, depth estimation may be performed on those 2D images via a depth estimation module 204. When the depth sensor 902 is also used to capture video and consequently the captured video includes a depth channel, the depth estimation module 904 may be bypassed even if depth data is desired. Alternatively, 2D RGB data may be the output directly from the video acquisition device 110 for further processing.

Regardless of whether the video data comprises depth information, the system 100 subsequently processes it to obtain head alignment information via head alignment module 906 and, optionally, to obtain head segmentation information via head segmentation module 908.

The head alignment data, the head segmentation data, and the RGBD data is then sent for optional filtering at a filtering module 910, transformed into the object space at transformation module 912, and preprocessing at preprocessing module 914, as described above in respect of FIGS. 7A-7D and FIG. 8. The output of these operations is texture data with holes, an object space representation of the person represented in the RGBD data, and, optionally, normals and alpha channels as described above in respect of FIG. 8. Image completion is then done using this data at completion module 916, with post-processing being done at post-processing module 918, all as described above in respect of FIGS. 7A-7D and FIG. 8.

Following post-processing, a 3D image is rendered based on the completed image at 3D rendering module 920. Alternatively, a 2.5D image may be rendered using a 2.5D rendering module 922 directly from the RGBD data without image completion.

The completion module 916 may be trained for use with multiple users or a single user. When using training data representing multiple types of users, a multi-person computational model is generated from which it can complete missing parts of unknown users without requiring any additional information about them. Alternatively, the completion module 916 can be trained for a single person (i.e. to result in a user-specific computational model) by being trained using only images acquired from that user. When using training data only for a particular user, the completion module 916 may be trained not to complete 3D images for any user who does not resemble the user used to train the module 916, even if completion may otherwise be possible.

While the depicted embodiments are generally described in the context of 2D-to-3D or 2.5D-to-3D reconstruction, in at least some example embodiments the reconstruction may be a 2.5D reconstruction as opposed to a 3D reconstruction. For example, the 2D-to-3D reconstruction may be simplified as a 2D-to-2.5D reconstruction, and the 2.5D-to-3D reconstruction may be simplified as a 2.5D-to-2.5D reconstruction. For 2.5D reconstruction, 3D scans used as part of the training data mentioned above may be replaced with corresponding 2.5D data.

Sequence of Hologram Prediction

The dynamic field of 3D communication and reconstruction has undergone numerous technological leaps, but several pertinent issues still hinder the development of realistic and high-quality 3D or 2.5D representations, especially in the areas of reconstruction and completion. One factor that affects the overall realism of a 3D or 2.5D representation (hereafter referred to as "hologram", which means any form of virtual figure in this context) is the synchronization between facial features and head movements. If this delicate balance is not maintained, the perceived authenticity can be significantly compromised, resulting in an inferior user experience. In addition, the temporal continuity or sequential nature of the produced holograms is integral to maintaining the illusion of realism. Any inconsistency in this progression can disrupt the user's suspension of disbelief, thereby compromising the immersive experience.

In at least some embodiments, the present disclosure utilizes the natural rhythms and behavioral sequences of facial features—such as eye, mouth, and overall facial and head movements—to significantly improve the hologram reconstruction and completion processes through a predictive process. By more accurately mimicking human-like behavior, the sense of realism in the resulting holograms is intended to be enhanced.

Additionally or alternatively, in at least some embodiments the present disclosure also seeks to further improve the quality of hologram reconstruction and completion as discussed above, particularly in challenging scenarios such as when frames are missing or when the headset needs to be removed to reveal a participant's eyes and eye behavior. In this way, the prediction process may be used to achieve a more seamless and immersive holographic experience.

Furthermore, in at least some embodiments the present disclosure improves the synchronization of various facial expressions and movements during the hologram completion process. By perfecting this synchronicity, holograms may be created that are not only more realistic, but also capable of replicating human expressions and interactions with unprecedented accuracy.

Advancements in generative modeling and vision transformers like Vision Transformer (ViT) and Video Vision Transformer (ViViT, or added video-vision-transformer), have opened up promising avenues for refining the modeling of hologram data within video sequences. The ability of these generative models to produce believable sequences significantly enhances the reconstruction or completion of holograms, especially when large areas or long-time consecutively missing parts (such as during headset removal)

need to be filled in. In addition, the use of generative models may replace the reconstruction or completion process as discussed above with respect to FIGS. 6A to 10 in some scenarios where computational power is insufficient.

An example of the prediction process of the present disclosure can be seen in a setup designed to generate eye blink behavior. Here, a hologram reconstruction coupled with a headset removal system uses eye-tracking technology to reconstruct the direction of gaze. If direct reconstruction of the blink action proves impossible, a generative model can be used to simulate the blink of a specific individual or participant, ensuring that it appears natural and convincingly correlates with their speech and behavior.

In addition to headset removal, a predictive model may be used to improve hologram reconstruction and/or completion in a number of aspects of natural communication, such as eye behavior, mouth and facial expression, head movement, cues, and the like. It should be understood that the predictive model may be used to improve one or more of the above aspects depending on the actual needs and limitations of the environment.

Eye Behavior

Conventionally, the majority of eye movement research has focused on tasks related to the visual target, such as target tracking or image viewing. However, in the context of holographic communication, the social behavior of the eyes becomes more important. This includes behaviors exhibited while speaking, observing conversations, or in social settings. To accurately predict eye behavior, a predictive model of the texture and 3D surface (or alternatively texture only) of the eye area is helpful, which includes:

Gaze behavior—course of gaze direction and depth, including acceleration and timing, and correspondence between left and right eye behavior;

Pupil behavior;

Eyelid behavior, including blinking;

Eyebrow behavior; and

Skin behavior around the eyes, wrinkles, etc.

Mouth and Facial Expression

Modeling the mouth and facial expression in a hologram sequence requires consideration of the texture and 3D shape of the mouth and skin areas required for the expression, as well as synchronization of the mouth and facial expression with the participant's speech, gaze, and head movement. This task parallels D-ID (de-identification) speaking avatars that generate speech animation from text, but in the present disclosure the focus is on predicting missing hologram data from incomplete or imperfect hologram data.

Head Movement

The positioning and rotation of the participant's head may be useful for the mapping of camera and 3D hologram data, as well as the positioning of the hologram in a virtual conference 3D space. Correct approximation of head movement, velocity, and acceleration, as well as specific head movement patterns are integral to non-verbal communication and may significantly aid in hologram reconstruction and/or completion. However, the accuracy of the hologram's position and rotation metadata, obtained from camera and 2.5D/3D sensor data, decreases when the input data contains significant missing content or when specific facial expressions dramatically change the shape of the head. It is therefore useful to predict both hologram content and head position metadata using the same input data, which may include one or more of head position, rotation, velocity, angular velocity, acceleration, or angular acceleration.

Cues

To create a convincing hologram, it may be advantageous to have a correspondence between the speech of the displayed participant and the eye behavior, mouth and facial expression, and head position of the hologram. Audio data or a text transcription of the audio may be used as an auxiliary input to the predictive model. Other auxiliary signals such as image/3D data, metadata of other participants and their facial expression metadata may also be used to improve the predictability of the hologram's future facial expressions or head movements.

Figure 11:
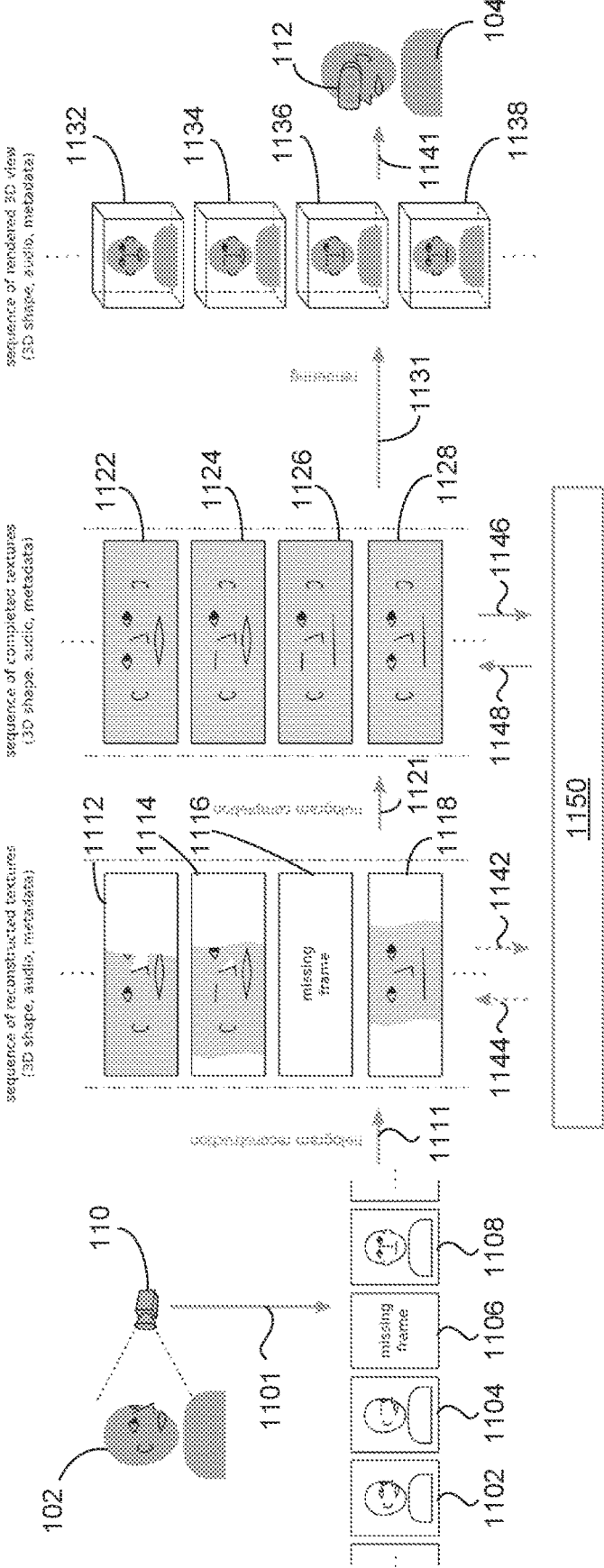
FIG. 11 represents a sequence of hologram prediction combined with image reconstruction/completion being performed on a conference participant using the system of FIGS. 1 to 3 according to additional example embodiments.

Referring now to FIG. 11, an example process for performing a sequence of hologram prediction on a 2.5D or 3D image acquired of the face of a person, such as the first participant 102, partaking in electronic communication such as a holographic video conference is depicted. The term "hologram prediction" refers to filling in relatively large missing areas, such as those resulting from a headset or mask on the head of the participant 102, that cause the image data to lack a representation of the eyes or mouth. In addition, "hologram prediction" may also refer to predicting aspects of natural communication, such as eye behavior, mouth and facial expression, head movement, cues, etc., to improve the reconstruction and/or completion, thereby making the holographic communication more natural and believable. The operations depicted in FIG. 11 may be performed, for example, using the integrated subsystem 616 of the cloud infrastructure 114.

In FIG. 11, the first video acquisition device 110 acquires 2.5D data 1103 in the form of a sequence of video frames (arrow 1101). It should be understood that in other examples, the first video acquisition device 110 may be capable of directly acquiring 3D images. The sequence of video frames comprises a first frame 1102 in which both eyes of the participant 102 are open and the right face of the participant 102 is facing the first video acquisition device 110; a second frame 1104 in which the right eye of the participant 102 is closed and the right face of the participant 102 is facing the first video acquisition device 110; a third frame 1106 in which the image information is missing (blank frame); and a fourth frame 1108 in which both eyes of the participant 102 are open and the front of the participant 102 is directly facing the first video acquisition device 110. Each of the frames may contain one or more of a 2D image (such as shown in FIG. 10A), a depth image (such as shown in FIG. 10B), audio data, or metadata such as head position, rotation, velocity, angular velocity, acceleration, or angular acceleration, with those particular examples of metadata collectively comprising "head alignment data". In some examples, head segmentation data may also be obtained as metadata, which delineates the separation of the head from the background and from the torso, and which may comprise a curve delineating an outline of imaged portions of the head. In some examples, gaze direction and eye blink data may also be obtained as metadata.

The blank third frame 1106 may be caused by the completion process as discussed above with respect to FIG. 8, due to extreme view angles of the head. It may also be caused by the loss of data in the course of data transmission.

The 2.5D data 1103 is then deterministically projected into an object space (arrow 1111) to reconstruct the hologram as a first reconstructed frame 1112, a second reconstructed frame 1114, a third reconstructed frame 1116, and a fourth reconstructed frame 1118. One or more artificial neural networks may be applied (arrow 1121) to the first, second, third, and fourth reconstructed frames 1112, 1114, 1116, 1118 to fill in the "holes" or missing parts, thereby performing image completion. As a result, completed texture and depth object space representations are obtained for a first completed frame 1122, a second completed frame 1124, a third completed frame 1126, and a fourth completed frame 1128, wherein the missing third frame is filled in by neural networks. The completed texture and depth object space representations may be used to render (arrow 1131) a sequence of 3D representations of the participant 102's face as a first rendered 3D view 1132, a second rendered 3D view 1134, a third rendered 3D view 1136, and a fourth rendered 3D view 1138. These processes correspond, for example, to those described above with respect to FIGS. 7A-7D and FIG. 8 (the arrows 802, 804, and 805).

These rendered views are transmitted to the first display device 112 of the second participant 104 (arrow 1141). This corresponds to the scenarios explained with respect to FIGS. 1 to 3.

In one example, the completed first, second, third, fourth frames 1122, 1124, 1126, 1128 may be input to a generative prediction subsystem 1150 (arrow 1146) for further improvement, such as working on predicting eye behavior, mouth and facial expression, head movement, etc., as discussed above. The generative prediction subsystem 1150 is capable of outputting a predicted result that can be transmitted back to the completion stage (arrow 1148). The output predicted result may be in the same format or in a similar format to the input data for ease of rendering and processing. The subsystem 1150 may be an in-house trained generative predictor or a pre-trained generative predictor, for example any pre-trained large language model. The proposed data encoding would allow the use of currently known generative models (based on transformers, stable diffusion, GANs, or autoencoders) as well as pre-trained language models in the subsystem 1150.

Alternatively or additionally, the reconstructed first, second, third, fourth frames 1112, 1114, 1116, 1118 may be input to a generative prediction subsystem 1150 (arrow 1142) for further improvement, such as working on predicting eye behavior, mouth and facial expressions, head movement, etc. These frames are not completed by neural networks, so one or more areas are still missing. The use of the generative prediction subsystem 1150 is able to fill in these incomplete areas to output believable results (arrow 1144). Similarly, the format of the output result is the same or similar to the input data. The hologram prediction process involving 1142, 1144, 1146, 1148, 1150 will be explained in detail with reference to FIGS. 12 and 13 below.

Figure 12:
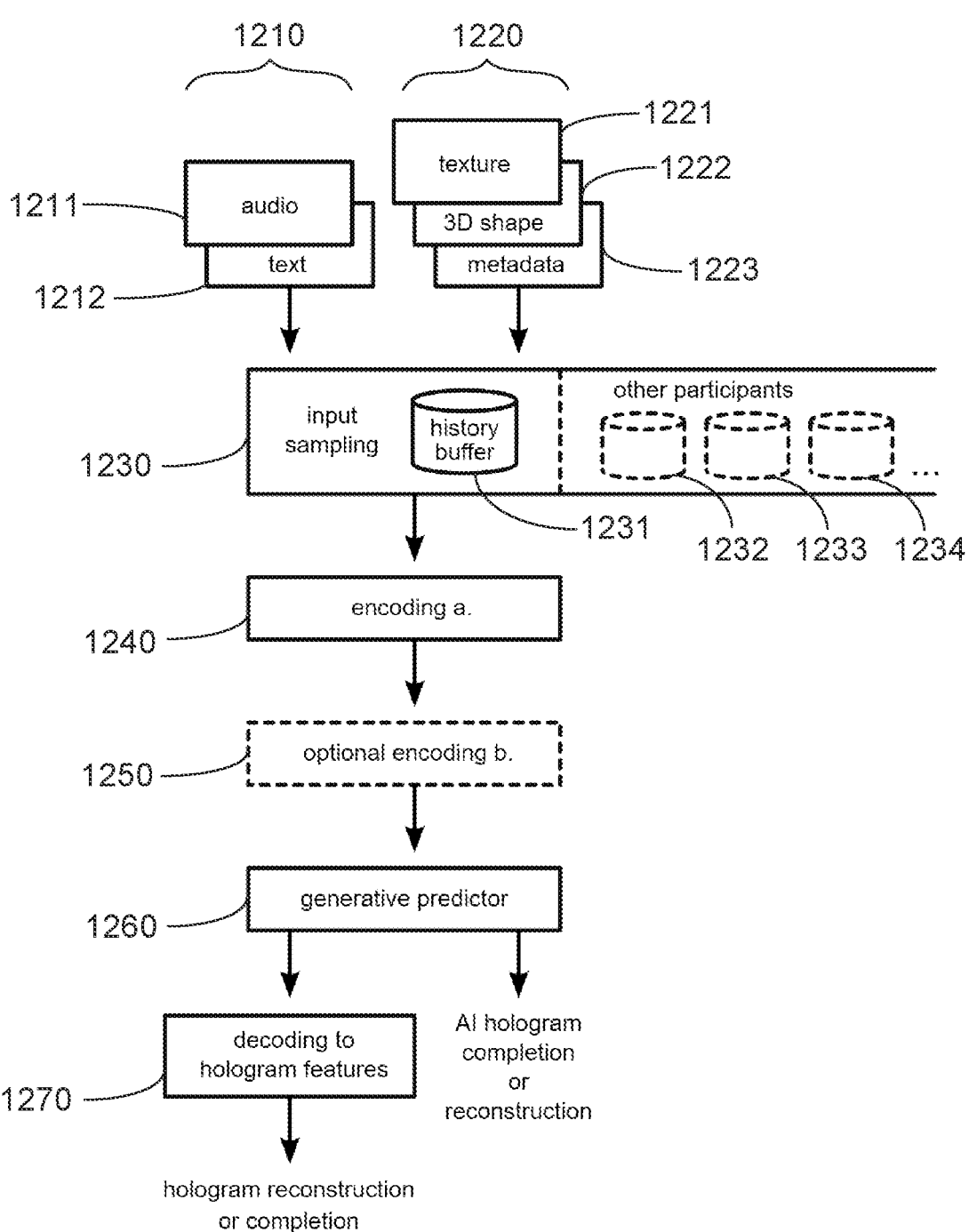
FIG. 12 depicts a block diagram of a system for a sequence of hologram prediction according to additional example embodiments.

Referring now to FIG. 12, an example block diagram of a hologram prediction system is shown in accordance with additional example embodiments. First, verbal communication data 1210 and visual modeling data 1220 of a conference participant (such as the participant 102) in a current time frame are obtained as a current sample. The verbal communication data 1210 and the visual modeling data 1220 may be obtained from the reconstruction step such as exemplified by the first, second, third, fourth reconstructed frames 1112, 1114, 1116, 1118 in FIG. 11 and/or from the completion step such as exemplified by the completed first, second, third, fourth frames 1122, 1124, 1126, 1128 in FIG. 11. Alternatively or additionally, the verbal communication data 1210 and the visual modeling data 1220 may be directly received from another source. For example, if the first video acquisition device 110 is a 3D camera that can generate and output images in an object space, the verbal communication data 1210 and the visual modeling data 1220 may be directly from the first video acquisition device 110 as well. This means that the reconstructed or completed images may be performed by the first video acquisition device 110, rather than by a cloud computing service or third party provider.

The verbal communication data 1210 refers to any data related to speech during the communication, and may include at least one of audio data 1211 or text data 1212. In some examples, the text data 1212 may be a text transcription of the audio data 1211. The visual modeling data 1220 refers to any data related to the image during the communication, and may include at least one of texture data 1221, shape data 1222, and metadata 1223 in some examples. The texture data 1221 refers to color information in an image, which may typically be in the format of RGB or CMYK, and which may be the output as processed by the texture reconstruction subsystem 608, for example. The shape data 1222 refers to shape information of an object, which may be the output as processed by the 2D-to-3D reconstruction subsystem 606, for example. The metadata 1223 refers to data related to electronic communication, such as head position and head rotation data, velocity, acceleration, head segmentation data, gaze direction, eye blink data, facial expression data, and the like. The metadata 1223 may include at least one of the above data. The head position and head rotation data as well as velocity and acceleration may be collectively referred to as head movement data. The gaze direction and eye blink data may be collectively referred to as eye behavior data. The explanation of the above metadata is provided below:

Head Position and Head Rotation Data: These data points refer to the spatial position of a person's head and its orientation, respectively. The head position indicates where the head is in a 3D space, while the head rotation data indicates the angle or tilt of the head. These can be derived from the camera or depth sensor data.

Velocity and Acceleration: Velocity refers to the rate of change of the position of the head over time. It determines how quickly someone is turning or moving their head in any direction. Acceleration, on the other hand, is the rate of change of velocity. It would measure how quickly someone is speeding up or slowing down their head movement.

Head Segmentation Data: This refers to the identification and delineation of the head within a given image or frame. Segmentation separates the head from the rest of the image, enabling more focused analysis or manipulation of that portion of the image.

Gaze Direction: This is a measure of where a person is looking, typically expressed as a vector or an angle from some reference point. It can be determined through various techniques, including eye-tracking technology.

Eye Blink Data: This data represents the frequency, duration, and timing of a person's eye blinks. It is usually detected using a combination of image and motion analysis.

Facial Expression Data: This refers to information about the configuration and movement of facial features that create expressions such as happiness, sadness, surprise, and so forth. This is typically determined by tracking key points or "landmarks" on the face and analyzing their movement over time.

The verbal communication data 1210 and the visual modeling data 1220 are then available as a current sample in an input sampling subsystem 1230. In addition, the visual modeling data and/or the verbal communication data from various past time frames of the conference participant (e.g., participant 102) may be selected as past samples. This data represents historical records of the participant's behavior during previous holographic interactions and is stored in a history buffer 1231, which acts as a reservoir for quick access to past data.

These past time frames may be either regularly sampled at a constant frequency or irregularly sampled, depending on specific data requirements. The frames could be from the same conference call or pulled from earlier calls or recordings. The aim is to create a comprehensive behavioral profile of the participant from different scenarios. This data, when fed into a generative prediction model, helps to personalize the hologram. For example, the participant's specific eye blink pattern can be replicated in the current or future hologram, enhancing its realism and making the holographic communication experience more authentic and engaging. It should be understood, however, that while the use of past time frames can enhance the communication experience, hologram prediction still works without the inclusion of past time frames.

Predicting eye-blink behavior for the current time frame or future time frames may enhance the authenticity of a holographic representation. A person's blink pattern is usually unique and often coincides with the speech and behavioral characteristics. By incorporating the predictive model described herein, the accuracy of expected eye blink behavior can be achieved. For example, the predictor model may work by learning temporal patterns of eye blinks from a sequence of previously observed frames, such as from the history buffer 1231. The predictor model may be trained on a large dataset that captures the wide range of eye-blink behaviors associated with different facial expressions, speech patterns, and other individual characteristics. This learning process equips the generative predictor with the ability to generate sequences of vectors (especially the elements associated to eye behaviors or eye blinking) that reflect a participant's unique eye-blink pattern. These predicted vectors may then be transformed back into a form that the hologram reconstruction or completion modules can understand, allowing it to generate future frames with accurately predicted eye-blink behavior. In addition, the eye blinking prediction may be adaptive, meaning that it continually updates its understanding of the individual's blink patterns as it processes more frames. This adaptability is essential for dealing with dynamic, real-time scenarios and ensuring that the predicted eye blink behaviors remain consistent with the individual's evolving expressions and speech patterns. Thus, the use of such a predictive model can bring an increased level of realism to holographic representations, contributing to a more immersive and authentic communication experience.

To amplify the depth and authenticity of the communication experience, the input sampling subsystem 1230 may optionally integrate visual modeling data and/or verbal communication data from other participants in the holographic interaction. The inclusion of this additional data improves the capacity to accurately predict and render the hologram's future facial expressions or head movements. This may be useful in generating a hologram that not only looks real but also behaves realistically, reacting in ways that are consistent with the other participants' behavior.

For example, various types of data may be provided, such as shape data, texture data, facial expression data, and other metadata from additional participants, here identified as first, second, and third additional participants 1232, 1233, 1234, as shown by the input sampling subsystem 1230 in FIG. 12. This includes using shape data to maintain consistency in facial structures, texture data to match skin tone or lighting conditions, and facial expression data to synchronize reactions among participants. Other metadata may include any additional information that helps create a more authentic holographic representation, such as head position or eye movement data.

In addition, the visual modeling data from these additional participants may come from the current time frame, from past time frames, or from both. This means that the generative prediction model may access and use data from the current interaction (current time frame) and also draw on previously recorded interactions (past time frames) involving these participants. This approach provides a richer context from which to work, allowing it to anticipate and simulate future behavior in a way that feels more natural and realistic to observers. For example, if a participant typically squints when smiling, having access to this historical data may help generate a hologram that accurately reflects that specific behavior. It should be understood, however, that while the integration of additional participants can enhance the communication experience, hologram prediction still works without the inclusion of additional participants.

Then, samples from the input sampling subsystem 1230 are provided to a first encoding subsystem 1240. The samples contain at least the current sample that refers to the current time frame of the conference participant. As discussed above, the samples may optionally contain the past samples that refers to the past time frames of the same participant. In addition, the samples may optionally contain a current time frame and/or past time frames of one or more additional participants. The current sample is encoded by the first encoding subsystem 1240 into a first plurality of vectors representing a sequence of states of the current sample as an encoded result. Optionally, the past samples are encoded by the first encoding subsystem 1240 into a second plurality of vectors representing a sequence of states of the past samples. Alternatively, the current sample and the past samples are encoded collectively into a plurality of vectors as the encoded result.

The encoding process ensures that the encoded result, whether it includes only the encoded current sample or both the encoded current sample and the encoded past samples, can be in a format suitable as an input to a generative predictor 1260 (corresponding to the generative prediction subsystem 1150 shown in FIG. 11).

The process of encoding data for hologram generation involves transforming complex, multi-dimensional information into a sequence of vectors. These vectors are multidimensional and represent a sequence of hologram states. Each state can be described by numerous parameters such as texture, shape, eye behavior, mouth and facial expression, head movement, landmark position, speech, or script.

For example, in one scenario, a particular hologram state is characterized by a number of elements, such as 1024 elements for RGB texture, another 1024 elements for 3D shape, 1024 elements for recent audio (speech) data, 128 elements for text transcription (script), 6 elements for head position and rotation (head movement), 60 elements for landmark positions, and 60 elements for facial expression parameters. Each element may typically be a number. The texture representation may typically be a vector of deep features obtained from a texture of a hologram by presenting the texture as input to a deep neural network and sampling its hidden features. Alternatively, the RGB texture representation may be extracted from a 3D point-cloud or radiance-field representation by presenting such a representation as input to an appropriate deep neural network and sampling its hidden features. A 3D shape representation may typically be a depth map in appropriate space presented as input to a deep network and sampling the vector of hidden features, or alternatively, mesh vertex data, point cloud data, radiance field opacity data, or signed distance field data or other presented to an appropriate deep network and sampling as hidden features. An audio (speech) data representation may typically be a recording of an interval of audio data, preprocessed and presented to an appropriate deep network for sampling the hidden features. Text transcription representation may typically be a text transcription of an audio interval encoded as text. Head position and rotation vector may typically be a direct value in degrees and meters, or direct elements of a rotation matrix, or other rotation or position representations such as quaternions or others. Landmark positions may typically be facial landmarks from any landmark detection system represented as a vector of numbers, such as sparse 2D or 3D landmarks from a Dlib-like system, or dense 3D mesh-like landmarks. Facial expression parameters may typically be a vector of Blend Shapes-like parameters describing the intensities of particular expressions obtained from a facial expression detection system, typically encoded as a vector of numbers. If this information is to be sampled from a total of three participants in a conversation over 64 instances in history, the length of the input vector would be $(1024\times3+128+6+60\times2)\times3$, or 9978. Therefore, if past samples are to be considered, a total of 65 such vectors may be fed as input to the predictor.

The sequence length can be fixed (e.g., ten seconds or ten minutes) or dynamic (e.g., the length of the last ten words). However, if computational resources allow, longer sequences may be more advantageous as they provide more context for prediction. In addition, historical data from previous calls or recordings may be included to tailor behavioral predictions to specific individuals, such as capturing the unique eye blink patterns of a particular person.

Data compression may also be useful for the process. The image, shape, and audio data are transformed into a more compact format, known as "hidden features," using deep learning models. For example, a standard ResNet model ("Residual Network"—a type of convolutional neural network architecture designed to combat the problem of vanishing gradients and enable the training of deeper networks) pre-trained on ImageNet (a large visual database designed for use in visual object recognition software research) data may be used to reduce the data to 2048 hidden features. This reduced feature set may be further compressed using dimensionality reduction methods such as PCA ("Principal Component Analysis"—a statistical procedure that uses orthogonal transformation to convert a set of observations of possibly correlated variables into a set of values of linearly uncorrelated variables called principal components), which may further reduce the feature set (for instance, from 2048 to 1024).

Alternatively, instead of using generic pre-trained models, specialized neural networks trained on domain-specific data may be used. For example, an in-house autoencoder network, similar to the pix2pix U-net (a conditional Generative Adversarial Network (cGAN) that's used for image-to-image translation tasks), may be trained on a collection of hologram textures. Similarly, for audio, a pre-trained audio model may be used, or a specialized in-house trained autoencoder may be applied.

The transformation of both visual modeling data and verbal communication data into a vector serves several functions in the embodiments as described herein. First, the conversion of disparate data types such as image, audio, and text into a uniform vector format standardizes these diverse forms of data. This standardization provides a consistent interface that enables seamless integration and interoperability across different computing processes and algorithms. In addition, vector representations serve as a dimensionally reduced form of high-dimensional data, effectively combating the problematic "curse of dimensionality" inherent in such data types. By distilling the essential features of these complex data types, vector representations contribute to improved processing efficiency and model performance.

Specifically, vectors inherently facilitate mathematical operations such as dot products and summation, which are useful in the context of many machine learning models. Transforming data into a vector format also aligns the data with the operational requirements of a variety of machine learning models, including neural networks. This compatibility ensures smooth use of these computational methods. In addition, encoding data in a vector format may result in a more compact representation of the data, improving the efficiency of storage and computational requirements. In summary, encoding data in vectors provides the foundation for effective implementation of subsequent predictive modeling by the generative prediction model.

After the encoding process performed by the first encoding subsystem 1240, the encoded result may be entered directly into the generative predictor 1260 as a prompt. The generative predictor 1260 outputs a predicted result having at least one element of the first vector updated. In one example, the output predicted result has the same format as the input encoded result to facilitate processing by downstreaming subsystems. It should be understood that the predicted result may also have a different format.

Generative predictors have developed rapidly in recent years. For example, Generative Pre-trained Transformers (GPT), such as ChatGPT™, along with other transformer-based language models, are adept at generating sequences of text after unsupervised training on large corpus of text data. This method has also been adapted to model image or video data, using ViT and ViViT as examples. Due to the synchronized timing of text, facial expressions, and head movements during speech, these generative language models are well suited for predicting facial expressions and head movements.

The utility of a generative predictor lies in its ability to enhance the output vector formulated by the encoder by generating sequences that are both coherent and realistic. This type of model is capable of predicting missing data segments, producing novel data instances, and improving the quality of data reconstruction. This is achieved by exploiting the patterns detected during the training phase of the model. In particular, when generating sequences for incomplete or missing hologram data, generative predictors significantly improve the authenticity and quality of the resulting holographic representation.

In summary, after the generative predictor 1260, at least one element of the predicted result is changed compared with a corresponding element of the encoded result. Such an element refers to an aspect of the sequence of states of the current sample, such as texture, shape, facial expression, head movement, landmark position, speech, or script.

Modern generative predictors are neural networks models, typically transformers or diffusion models, like the Generative pre-trained transformers (GPT) used originally for natural language processing tasks, or Stable diffusion models used for image processing tasks.

To function efficiently, a neural network predictor typically requires training on relevant data to understand the patterns and structures inherent in the data. For example, when applied to holographic data, the model may be trained on large and diverse datasets that include human behaviors, facial expressions, head movements, and more. This facilitates the model's ability to accurately predict realistic behaviors and movements in the hologram. However, it should be understood that a generative predictor without specific re-training of new situations or subjects is still capable of improving the quality of holographic reconstruction or completion of such situations or subjects. For example, the model may be trained on a dataset of 3D video scans of different human conversations, using data from either a 3D scanner or a 3D reconstruction. Alternatively, a generative model may be trained on data that is not directly related to 3D representation, but is related to human behavior, such as the text data. This includes generic, pre-trained models for large languages. Although models trained on 3D data may be more efficient, their quality depends on the training data, which is why the prediction quality of pre-trained language models could be superior.

The speed at which a generative predictor operates varies widely, depending on the complexity of the model, the dimension of the input data, and the computational resources available. However, with robust computational resources and optimized models, it is possible to generate predictions in real-time or near real-time, which is beneficial for real-time holographic communication applications such as teleconference.

Some potentially useful generative prediction models that are available and suitable to be used for holographic prediction include:

Transformer models: Models based on the Transformer architecture, such as Vision Transformers (ViT), Video Vision Transformers (ViViT), and Generative Pre-trained Transformers (such as GPT-3), have shown great potential in sequence prediction tasks and could be adapted for holographic prediction. These models excel at tasks involving temporal data and can effectively handle complex sequences.

Stable Diffusion models: Models based on latent diffusion idea for iterative denoising of input, which when applied to low-quality input can refine it in a generative process. These models were used in several image and video applications, including a text to image generation.

GANs: GANs have demonstrated remarkable success in generating realistic images and can be adapted for holographic prediction. Notable GAN models that could be leveraged include StyleGAN and CycleGAN, both of which have shown proficiency in generating highly realistic images and could potentially be used to generate holographic data.

Autoencoders: Autoencoder neural networks, including Variational autoencoders (VAEs) and their many variants are good at modeling complex data distributions, which could be ideal for holographic data, which tend to be complex and multidimensional.

Optionally, the method of the present disclosure may further include a second encoding subsystem 1250 for further encoding the encoded result from the first encoding subsystem 1240. After the further encoding performed by the second encoding subsystem 1250, the further encoded result is transmitted to the generative predictor 1260.

In some examples, the further and optional encoding step performed by the second encoding subsystem 1250 may transform the vector-based input data into a sequence of symbolic tokens, thereby enhancing compatibility with a transformer-based architecture or implementation. In this process, the input vectors are subjected to a clustering operation, resulting in distinct clusters with assigned names or "tokens".

According to the characteristics of transformer models, which include architectures such as GPT-4 and BERT, tokenization of input sequences is performed. While these models are capable of processing sequences of vectors, they typically operate on sequences of tokens. Tokens may represent elements such as words or subwords in text-based data. The process of converting vectors to tokens changes the structure of the problem, making it more compatible with these transformer-based models. Tokens in this scenario symbolize discrete states or categories, and thus present a modeling and prediction task that may be simpler than handling continuous vectors. In addition, the act of tokenization provides a means to achieve a more compact and efficient representation of data. The tokens that serve as identifiers for clusters may effectively encapsulate the characteristics of the data. As a result, this allows for improved learning efficiency within the model. This approach therefore provides a unique advantage in applying transformer-based models to tasks such as predicting holographic interactions.

To illustrate, an example is provided in the following. The below clusters are created: 26×26 clusters for texture data, 128 clusters for audio data, 26 clusters for facial expression data, and 5×2×2 clusters for head rotation and transcribed text data. The subsequent encoded input may take the following form "texture=ad audio=37 expression=h rotation=201 text=hello texture=ax expression=i text=Martin . . . " where "texture=ad" is example of cluster at position [1,4] among 26×26 clusters encoded as positions in English alphabet a=1 and d=4, the "audio=37" is example of 37th cluster out of 128 available, the "expression=h" is example of alphabet-encoded 8th cluster of facial expressions out of 26 total, the "rotation=201" is an example of rotation in segment 2 out of 5 possible in y-axis, 0 out of two possible 0/1 in x-axis and 1 in z-axis, the "text=hello" is a text transcription of the spoken word at the given time. Similarly, depending on the accuracy of available data and available computing power, other combinations of encoding may be used.

This may be interpreted as a text form of the variable-name-to-value hashing trick, a method of pairing variable names and values so that values of the same variable appear closely related in the model's hidden space. However, for simpler input data types, such as texture and audio only, the variable names may be excluded, simplifying the encoded input to "ad 37 ax ad 32 12 bd 11 cc ca cd . . . "

In cases where the clustering method results in ordered clusters, such as Self-Organizing Map (SOM) clustering, the names of the clusters can be derived directly from their order. For example, a 26×26 SOM output corresponds to 26 rows and 26 columns, allowing cluster naming from "aa" to "zz". Similarly, angle data may be separated into three ordered clusters by angle range, e.g., −180 to −10, −10 to 10, and 10 to 180, which may be symbolized as "0", "1", and "2", respectively.

However, for unordered clustering methods, such as K-means clustering, the names may be randomly assigned to the clusters. Notably, each of these encoding variations aims to transform complex multidimensional vector data into a simplified, symbolic form that matches the input expectations of Transformer-based generative prediction models, allowing for smoother data integration.

Optionally, the output of the generative predictor 1260 (whether it is encoded by the first encoding subsystem 1240 or encoded by both the first and second encoding subsystems 1240, 1250) may be decoded by a decoder 1270 into a form compatible with the hologram reconstruction process. Once the vectors or the tokens are generated by the generative predictor 1260, they may be transformed back into a format that can be effectively used by the reconstruction subsystem (as indicated by the arrow 1144 in FIG. 11) or the completion subsystem (as indicated by the arrow 1148 in FIG. 11). This transformation process may be facilitated by the decoder 1270. The decoder's task is to receive the generative predictor's output vectors or tokens and convert them into a format that can be recognized and used by the reconstruction or completion subsystem. This may involve decoding the vectors or tokens back into texture data, shape data, audio data, or any other type of data used by the reconstruction or completion subsystem to recreate the holographic representation.

The generated data, after decoding, closely matches the shape of the original input data (such as indicated by the arrows 1142 and 1146). It may then be used by the system to manifest the predicted current or future states of the hologram. This includes rendering facial expressions, head movements, and other details present in the original input data. The decoder may be trained in synchrony with the encoder and the generative predictor, so that the decoder is able to accurately and efficiently translate the generative predictor's output vectors or tokens into a form that can be used by the original reconstruction or completion subsystem. This process is typically accomplished by training the encoder, generative predictor, and decoder together in a comprehensive system that promotes better understanding and synergy between the components.

In addition, if an autoencoder is used for feature generation, the decoder portion of a standard encode-decode capable autoencoder may be used to decode the predictor's output back into image form, including shape and audio. The advantage of using an autoencoder is its ability to compress data into a low-dimensional form, making it easier to manipulate, and then expand it back into its original dimensions. This decoding process is typically faster than the reverse search method and may be used to efficiently generate high quality holographic images.

In some alternative examples, the decoder 1270 may not be necessary. Instead, the predicted result from the generative predictor 1260 may be fed directly into a pre-existing artificial neural network model. This model then translates the output vectors or tokens of the generative predictor into a format that the original reconstruction or completion subsystem can utilize. For instance, the output from the generative predictor 1260 may be used directly as an auxiliary input to the autoencoder-based neural network tasked with completing the missing parts of the hologram. For such a network, it is unnecessary to decode data into a specific format. This is because the network can learn the encoding during its training phase when it is exposed to encoded data (such as that produced by the 1240 or 1250) included within its training set.

Regardless of whether the predicted result is decoded by the decoder 1270 or processed by the artificial neural network model, the visual modeling data is updated based on the predicted result for rendering a 3D representation of the conference participant in the current time frame or future time frame(s).

The combination of the encoding process with the generative prediction model for holography provides several distinct advantages that improve the overall quality, efficiency, and flexibility of the resulting holographic representation. First, the encoding process converts the original modeling and verbal communication data into a structured vector or token form. This streamlines the processing and handling of the data, while enabling the extraction of meaningful features. By consolidating the complex information into a manageable vector or token format, the relevant aspects of the data may be effectively captured, resulting in more efficient and focused input to the generative prediction model. Second, the generative prediction model trained on a large corpus of data allows for robust and accurate predictions of holographic states. This is particularly beneficial when the input data is incomplete or imperfect. By predicting and generating sequences that correct for missing or unnatural parts in the current frame, the model effectively resolves distortions and improves the accuracy of the holographic representation.

Figure 13:
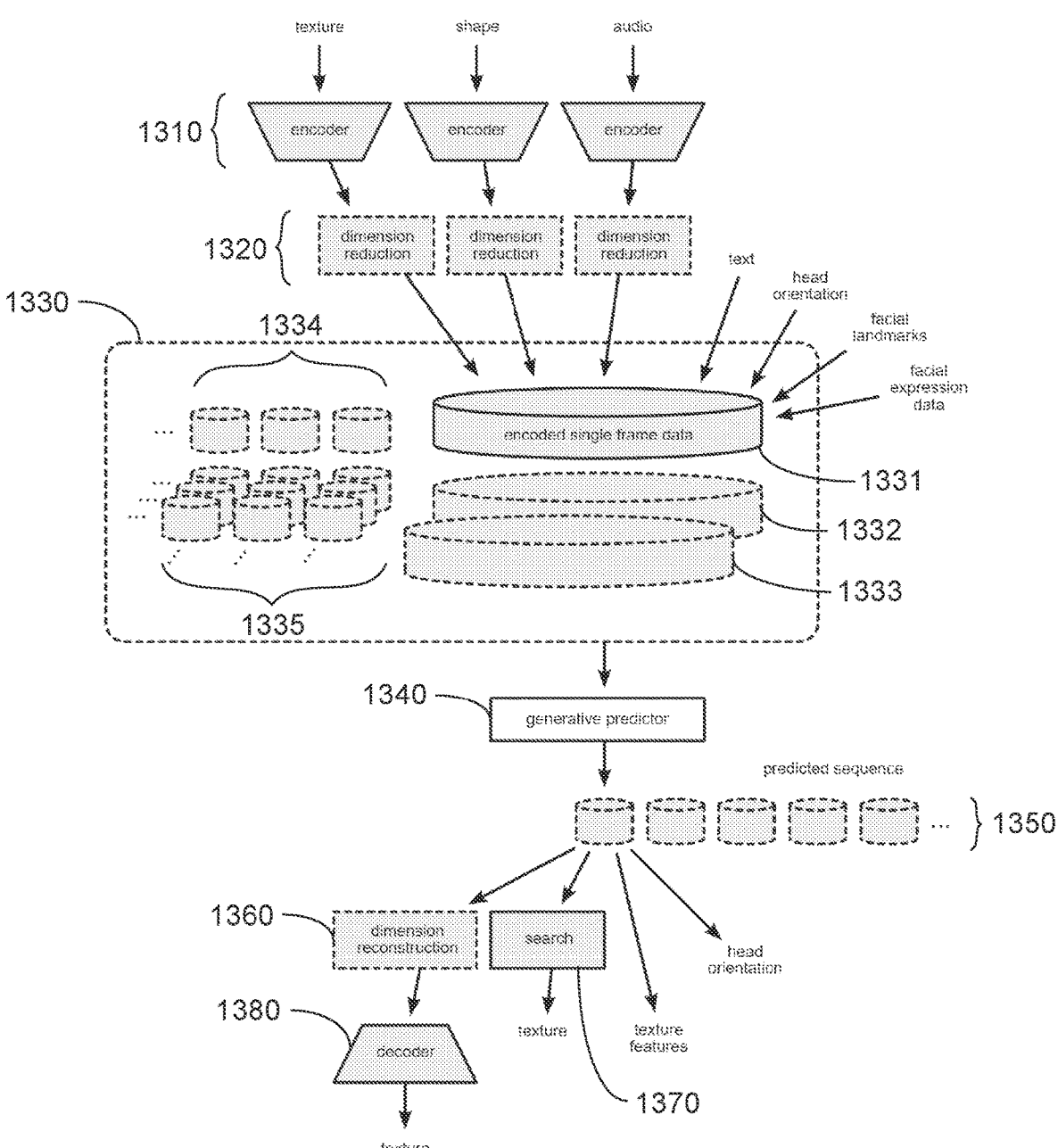
FIG. 13 depicts a block diagram of a system for encoding and prediction, according to additional example embodiments.

Referring now to FIG. 13, an example block diagram of a system for encoding and prediction is shown in accordance with additional example embodiments. The embodiment shown in FIG. 13 is similar to the embodiment shown in FIG. 12 but some details are exemplified.

First, texture, shape, and audio data are obtained and encoded by encoders 1310. Optionally, the encoded data is further compressed by dimension reduction subsystems 1320, such as the PCA discussed above, to save space. An encoded result at 1330 then includes the encoded texture, shape, and audio data. The encoded result may also include other data, such as text, head orientation, facial landmarks, or facial expression data, which may or may not be encoded by an encoder. The encoded result includes the above visual modeling data and verbal communication data of a conference participant in at least a current time frame as indicated by 1331. Optionally, the encoded result may also include data of additional conference participant(s) in the current time frame, as indicated by 1332, 1333. Optionally, the encoded result may further include data of the conference participant and the additional conference participant(s) in past time frames, as indicated by 1334, 1335. The encoded result is then input to a generative predictor 1340, as discussed above, and the generative predictor 1340 outputs a predicted sequence 1350. Some data in the predicted sequence 1350 may be used directly to update the visual modeling data, such as texture features and head orientation data.

Optionally, a dimension reconstruction subsystem 1360 may be incorporated into the system when the dimension reduction subsystem 1320 is used. In this way, the predicted data may be converted back to the format as output by the encoder 1310. In addition, a decoder 1380 may receive the output data from the dimension reconstruction subsystem 1360 to further convert the format of the data back to the format prior to input to the encoder 1310. As a result, visual modeling data such as texture data may be updated compared with the original data prior to encoding. Alternatively or additionally, the encoded texture data may be converted back to the original format by a search subsystem 1370, which may use simple distance based search of the most similar data vector, or may use a pre-trained artificial neural network to facilitate the conversion.

It should be understood that the term "hologram" in this context refers to a realistic representation for a conference participant used in the embodiments described herein and should be interpreted in a broad sense. A hologram may be any form of virtual figure, such as a realistic human representation, a parametric human representation (e.g., an avatar), a stereoscopic 3D representation, a volumetric representation, a mesh-based representation, a point-cloud based representation, a radiance field representation, or a hybrid representation. The above embodiments also apply to these other forms of 3D representations because the reconstruction/completion/prediction is capable of enhancing the user experience for any form of 3D representation.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or part of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is only for the purpose of describing particular embodiments and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

A "computer" or "server" used in the foregoing embodiments may comprise, for example, a processing unit (such as a processor, microprocessor, or programmable logic controller, including when they form part of a central processing unit or graphical processing unit) communicatively coupled to a non-transitory computer readable medium having stored on it program code for execution by the processing unit, microcontroller (which comprises both a processing unit and a non-transitory computer readable medium), field programmable gate array (FPGA), system-on-a-chip (SoC), an application-specific integrated circuit (ASIC), or an artificial intelligence accelerator. Examples of computer readable media are non-transitory and include disc-based media such as CD-ROMs and DVDs, magnetic media such as hard drives and other forms of magnetic disk storage, semiconductor based media such as flash media, random access memory (including DRAM and SRAM), and read only memory. In at least some example embodiments, a computer may also be embedded in or otherwise comprise part of a device such as a smartphone, tablet, television set, holographic projector, headset, and other similar or analogous devices.

It is contemplated that any part of any aspect or embodiment discussed in this specification can be implemented or combined with any part of any other aspect or embodiment discussed in this specification, unless those parts are mutually exclusive.

In construing the claims, it is to be understood that the use of computer equipment, such as a processor, to implement the embodiments described herein is essential at least where the presence or use of that computer equipment is positively recited in the claims.

One or more example embodiments have been described by way of illustration only. This description is being presented for purposes of illustration and description, but is not intended to be exhaustive or limited to the form disclosed. It will be apparent to persons skilled in the art that a number of variations and modifications can be made without departing from the scope of the claims.

The invention claimed is:

1. A method comprising:
 obtaining visual modeling data and verbal communication data of a conference participant in a current time frame as a current sample;
 encoding the current sample into a first vector comprising a plurality of states for the current sample as an encoded result, wherein the plurality of states comprises one or more of texture, shape, eye behavior, mouth and facial expression, head movement, landmark position, speech, or script, and wherein each of the plurality of states is characterized by a plurality of elements;
 updating at least one of the plurality of states by inputting the encoded result to a generative artificial intelligence model as a prompt;
 selecting the visual modeling data of the conference participant in a plurality of past time frames as past samples;
 encoding the past samples into a second plurality of vectors representing the plurality of states for the past samples;
 updating at least one of the plurality of states by inputting the second plurality of vectors to the generative artificial intelligence model as additional prompts;
 obtaining the updated plurality of states as a predicted result; and
 updating the visual modeling data based on the predicted result for rendering a three-dimensional (3D) representation of the conference participant in the current time frame or in one or more future time frames.

2. The method of claim 1, wherein updating the visual modeling data comprises inputting the predicted result to a reconstruction or completion artificial neural network model to obtain the updated visual modeling data for rendering the 3D representation of the conference participant in the current time frame or in the one or more future time frames.

3. The method of claim 1, wherein updating the visual modeling data comprises decoding the predicted result into the updated visual modeling data for rendering the 3D representation of the conference participant in the current time frame or in the one or more future time frames.

4. The method of claim 1, wherein the predicted result has a same format as the encoded result.

5. The method of claim 1, wherein the visual modeling data comprises one or more of texture data, shape data, facial expression data, head movement data, or eyes behavior data, and the verbal communication data comprises one or more of audio data or text data.

6. The method of claim 1, wherein updating at least one of the plurality of states comprises updating one or more of texture, shape, eye behavior, or mouth and facial expression of the conference participant where a portion of the conference participant's head is obstructed.

7. The method of claim 1, wherein the plurality of past time frames are sampled at a constant frequency.

8. The method of claim 1, wherein the plurality of past time frames are irregularly sampled.

9. The method of claim 1, further comprising, prior to encoding the past samples into the second plurality of vectors:
 obtaining at least one of the visual modeling data or the verbal communication data of additional one or more conference participants in the plurality of past time frames; and
 adding the at least one of the visual modeling data or the verbal communication data of the additional one or more conference participants in the plurality of past time frames into the past samples.

10. The method of claim 1, further comprising, prior to encoding the current sample into a first vector:
 obtaining at least one of the visual modeling data or the verbal communication data of additional one or more conference participants in the current time frame; and
 adding the at least one of the visual modeling data or the verbal communication data of additional one or more conference participants in the current time frame into the current sample.

11. The method of claim 1, further comprising:
 encoding the first vector into a sequence of token values; and
 updating the encoded result with the sequence of token values, such that the encoded result is compatible with the generative artificial intelligence model being a transformer model.

12. The method of claim 1, further comprising:
 obtaining a sequence of video frames captured by a camera for the conference participant, the sequence of video frames comprising two-dimensional (2D) image data, depth data, and head alignment data; and
 reconstructing, for the current time frame of the sequence of video frames, the visual modeling data by projecting the 2D image data from a world space into an object space using the head alignment data and depth data.

13. The method of claim 12, further comprising completing at least one missing part of the reconstructed visual modeling data by a pre-trained artificial neural network.

14. The method of claim 1, wherein the 3D representation of the conference participant comprises one or more of a hologram, a parametric human representation, a stereoscopic 3D representation, a volumetric representation, a mesh-based representation, a point-cloud based representation, a radiance field representation, or a hybrid representation.

15. The method of claim 1, wherein the generative artificial intelligence model is selected from one of transformer models, Stable Diffusion models, Generative Adversarial Networks, or autoencoders.

16. The method of claim 1, wherein the plurality of states comprises eye behavior, and the eye behavior comprises eye-blink behavior, and wherein the generative artificial intelligence model is trained based on the current time frame or a plurality of past training time frames for the conference participant that are capable of being encoded into a plurality of training vectors comprising a plurality of training states, the plurality of training states comprising the eye-blink behavior and at least one of facial expression or speech pattern, such that the trained generative artificial intelligence model is capable of generating predicted future states of eye-blink behavior based on the facial expression or the speech pattern.

17. The method of claim 16, wherein the generative artificial intelligence is trained to allow a mapping between the eye-blink behavior and at least one of the facial expression or the speech pattern.

18. A system comprising:
a network interface;
a processor communicatively coupled to the network interface; and
a non-transitory computer readable medium communicatively coupled to the processor and having stored thereon computer program code that is executable by the processor and that, when executed by the processor, causes the processor to perform a method comprising:
    obtaining visual modeling data and verbal communication data of a conference participant in a current time frame as a current sample;
    encoding the current sample into a first vector comprising a plurality of states for the current sample as an encoded result, wherein the plurality of states comprises one or more of texture, shape, facial expression, head movement, landmark position, speech, or script, and wherein each of the plurality of states is characterized by a plurality of elements;
    updating at least one of the plurality of states by inputting the encoded result to a generative artificial intelligence model as a prompt;
    selecting the visual modeling data of the conference participant in a plurality of past time frames as past samples;

encoding the past samples into a second plurality of vectors representing the plurality of states for the past samples;
    updating at least one of the plurality of states by inputting the second plurality of vectors to the generative artificial intelligence model as additional prompts;
    obtaining the updated plurality of states as a predicted result; and
    updating the visual modeling data based on the predicted result for rendering a three-dimensional (3D) representation of the conference participant in the current time frame or in one or more future time frames.

19. A non-transitory computer readable medium having encoded thereon computer program code that is executable by a processor and that, when executed by the processor, causes the processor to perform a method comprising:
    obtaining visual modeling data and verbal communication data of a conference participant in a current time frame as a current sample;
    encoding the current sample into a first vector comprising a plurality of states for the current sample as an encoded result, wherein the plurality of states comprises one or more of texture, shape, facial expression, head movement, landmark position, speech, or script, and wherein each of the plurality of states is characterized by a plurality of elements;
    updating at least one of the plurality of states by inputting the encoded result to a generative artificial intelligence model as a prompt;
    selecting the visual modeling data of the conference participant in a plurality of past time frames as past samples;
    encoding the past samples into a second plurality of vectors representing the plurality of states for the past samples;
    updating at least one of the plurality of states by inputting the second plurality of vectors to the generative artificial intelligence model as additional prompts;
    obtaining the updated plurality of states as a predicted result; and
    updating the visual modeling data based on the predicted result for rendering a three-dimensional (3D) representation of the conference participant in the current time frame or in one or more future time frames.

* * * * *